US012526761B2

(12) United States Patent
Comaravelou et al.

(10) Patent No.: US 12,526,761 B2
(45) Date of Patent: Jan. 13, 2026

(54) METHOD AND SYSTEM FOR MANAGING 5GMM PARAMETERS OF STANDALONE NON-PUBLIC NETWORK AT A USER EQUIPMENT

(71) Applicant: Samsung Electronics Co., Ltd., Suwon-si (KR)

(72) Inventors: Sivasankar Comaravelou, Bangalore (IN); Prasad Basavaraj Dandra, Bangalore (IN); Chetan Ramesh Ganig, Bangalore (IN); Danish Ehsan Hashmi, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 390 days.

(21) Appl. No.: 18/311,554

(22) Filed: May 3, 2023

(65) Prior Publication Data
US 2023/0362863 A1 Nov. 9, 2023

(30) Foreign Application Priority Data
May 4, 2022 (IN) .............................. 202241026054

(51) Int. Cl.
*H04W 60/00* (2009.01)
*H04W 8/20* (2009.01)
(52) U.S. Cl.
CPC ........... *H04W 60/005* (2013.01); *H04W 8/20* (2013.01)
(58) Field of Classification Search
CPC ..... H04W 60/005; H04W 8/20; H04W 60/00; H04W 84/10; H04W 8/183; H04W 8/22;
(Continued)

(56) References Cited

U.S. PATENT DOCUMENTS 11,172,458 B2 11/2021 Tiwari et al.
11,470,474 B2 10/2022 Palanigounder et al.
(Continued)

FOREIGN PATENT DOCUMENTS

WO WO-2022-211531 A1 10/2022

OTHER PUBLICATIONS

"Digital cellular telecommunications system (Phase 2+) (GSM); Universal Mobile Telecommunications Systems (UMTS); LTE; 5G; Non-Access Stratum (NAS) functions related to Mobile Station (MS) in idle mode" 3GPP TS 23.122 version 17.6.0 Release 17, pp. 1-132 (2002).
(Continued)

*Primary Examiner* — Mazda Sabouri
(74) *Attorney, Agent, or Firm* — Harness, Dickey & Pierce, P.L.C.

(57) ABSTRACT

A method for managing 5G Mobility Management (5GMM) parameters of a Standalone Non Public Network (SNPN) at a User Equipment (UE), the method includes selecting an SNPN identifier (SNPN ID) from among SNPN IDs in a first list, determining whether the first list includes a valid Subscriber Permanent Identifier (SUPI) for the SNPN ID, the first list including SNPN parameter values associated with the SNPN IDs, identifying a first SUPI from a first Universal Subscriber Identifier Module (USIM) of the UE in response to determining that the first list does not include the valid SUPI, generating a first SNPN registration request based on the SNPN ID and the first SUPI to attempt registration with a first SNPN associated with the SNPN ID, and updating a second list with the SNPN ID, the first SUPI, and a SNPN parameter value corresponding to the first SNPN upon successful registration.

8 Claims, 25 Drawing Sheets

(58) Field of Classification Search
CPC ....... H04W 60/04; H04W 48/18; H04W 8/26; H04W 48/02
See application file for complete search history.

(56) References Cited

U.S. PATENT DOCUMENTS

| | | | |
|---|---|---|---|
| 11,477,727 B2 | 10/2022 | Won | |
| 2021/0105712 A1 | 4/2021 | Speicher et al. | |
| 2021/0235365 A1 | 7/2021 | Jin et al. | |
| 2022/0053600 A1* | 2/2022 | Ganig | H04W 48/16 |
| 2022/0124497 A1* | 4/2022 | Lin | H04L 63/101 |
| 2022/0286850 A1 | 9/2022 | Lin et al. | |
| 2022/0286996 A1 | 9/2022 | Lin et al. | |
| 2023/0075285 A1* | 3/2023 | Jung | H04W 48/18 |
| 2025/0212098 A1* | 6/2025 | Velev | H04W 48/16 |

OTHER PUBLICATIONS

"Non-Acess Stratum (NAS) protocol for 5G System (5GS); Stage 3", 3GPP TS 24.501 version 17.6.1, release 17, pp. 1-943 (2022).

"Security architecture and procedures for 5G system" 3GPP TS 33.501 version 17.5.0, Release 17, pp. 1-296 (2022).

EESR dated Aug. 4, 2023 for corresponding EP Patent Application No. 23171436.1.

Danish Ehsan Hashmi et al: "5GMM parameter storage for AKA based SNPN", 3GPP Draft; C1-223881; Type CR; CR 4424; ENPN, 3rd Generation Partnership Project (3GPP), Mobile Competence Centre ; 650, Route Des Lucioles ; F-06921 Sophia-Antipolis Cedex ; France, vol. 3GPP CT 1, No. Online.

Danish Ehsan Hashmi et al: "SUPI from USIM for AKA based SNPN", 3GPP Draft; C1-225186; Type CR; CR 4636; ENPN, 3rd Generation Partnership Project (3GPP), Mobile Competence Centre ; 650, Route Des Lucioles ; F-06921 Sophia-Antipolis Cedex ; France, vol. 3GPP CT 1, No. Online; Aug. 18, 2022-Aug. 26, 2022.

"3rd Generation Partnership Project; Technical Specification Group Core Network and Terminals; Non-Access-Stratum (NAS) functions related to Mobile Station (MS) in idle mode (Release 17)", 3GPP Standard; Echnical Specification; 3GPP TS 23.122, 3rd Generation Partnership Project (3GPP).

"3rd Generation Partnership Project; Technical Specification Group Core Network and Terminals; Non-Access-Stratum (NAS) protocol for 5G System (5GS); Stage 3; (Release 17)", 3GPP Standard; Technical Ecification; 3GPP TS 24.501,3rd Generation Partnership Project (3GPP), Mobile Competence Centre ; 650.

\* cited by examiner

2100

METHOD AND SYSTEM FOR MANAGING 5GMM PARAMETERS OF STANDALONE NON-PUBLIC NETWORK AT A USER EQUIPMENT

CROSS REFERENCE TO RELATED APPLICATION

The present application claims priority under Indian Provisional Application 202241026054, filed on May 4, 2022, the contents of which are hereby incorporated herein by reference.

TECHNICAL FIELD

The present disclosure relates to Standalone Non-Public Networks (SNPNs), and more particularly, relates to methods and systems for storing 5G Mobility Management (5GMM) parameters of an SNPN at a User Equipment (UE).

BACKGROUND

An SNPN is a private network infrastructure that operates independently of public networks, such as the Internet, and is designed to provide secure communication and data exchange between devices within the network. Generally, the SNPN is operated by an NPN operator which does not rely on network functions provided by a Public Land Mobile Network (PLMN). Further, the SNPN is operated by an NPN operator, who may have subscriptions to multiple SNPNs which are identified based on a combination of a PLMN ID and a Network Identifier (NID).

Despite the various benefits provided by SNPNs, there are several challenges associated with the implementation and maintenance of SNPNs. For example, when storing 5G Mobility Management (5GMM) parameters in a non-volatile memory of a user equipment (UE), the SNPN may be mapped with an invalid Subscriber Permanent Identifier (SUPI), as the SUPI may be referred from a list of subscriber data where SUPI is not configured. Such a situation might lead to issues in subscription and SNPN selection. Furthermore, in conventional SNPN systems, the forbidden SNPNs, which may be classified as "temporarily forbidden SNPNs" or "permanently forbidden SNPNs," are not saved across power cycles. This may lead to the selection of a forbidden SNPN in the next power cycle by the UE, which delays the overall time to perform normal operations.

In general, a mobile equipment is configured with a list of subscriber data which includes information such as, a subscriber identifier, an Extensible Authentication Protocol (EAP) based primary authentication information, 5G Authentication and Key Agreement (AKA), etc. Further, the mobile equipment (referred as UE) when installed with a USIM, stores 5GMM parameters when operating in SNPN access mode. The storage of 5GMM parameters (ref. 24501 Annexure C2) is based on following conditions:

if the UE does not support access to an SNPN using credentials from a credentials holder, the 5GMM parameters shall be stored per subscribed SNPN in the non-volatile memory in the ME along with the subscriber identifier associated with the SNPN identity of the SNPN in the "list of subscriber data" configured in the ME (ref. 3GPP TS 23. 122 [5]) and if the UE supports access to an SNPN using credentials from a credentials holder, the 5GMM parameters shall be stored in a non-volatile memory in the ME per:

the subscribed SNPN along with the subscriber identifier associated with the selected entry in the "list of subscriber data" configured in the ME (see 3GPP TS 23.122 [5]); or the PLMN subscription along with the SUPI from the USIM which is associated with the PLMN subscription.

The 5GMM parameters include 5G-Globally Unique Temporary Identity (GUTI), last visited registered TAI, 5GS update status, 5G NAS security context parameters from a full native 5G NAS security context (see 3GPP TS 33.501 [24]), session keys KAUSF and KSEAF (see 3GPP TS 33.501 [24]), UE parameter update counter (see subclause 9.11.3.53A), and configured Network Slice Selection Assistance Information (NSSAI(s)).

Further, according to the conventional art, if the 5GMM parameters are associated with the PLMN subscription, then the 5GMM parameters may only be used if the SUPI from the USIM which is associated with the selected PLMN subscription matches the SUPI stored in the non-volatile memory, else the UE deletes the 5GMM parameters. Also, if the 5GMM parameters are associated with the subscribed SNPN of the entry in the "list of subscriber data", then the 5GMM parameters may only be used if the subscriber identifier of the selected entry of the "list of subscriber data" matches the subscriber identifier stored in the non-volatile memory. Thus, effective and efficient storage of 5GMM parameters is always a challenge in multi-USIM UEs when operating in SNPN access mode.

For ease the "list of subscriber data" mentioned in the above section in 23.122 3gpp TS section 4.9.3 may be referred to as "Operator based list of subscriber data" in the present disclosure. Further, the stored "5GMM parameters associated with the subscribed SNPN of the entry in the "list of subscriber data" along with the subscriber identity used" as mentioned in the above sections in 24.501 3gpp TS Annexure C2 may be referred to "UE based list of SNPN subscriber data and 5GMM Parameters" in the present disclosure.

SUMMARY

This summary is provided to introduce a selection of concepts in a simplified format that is further described in the detailed description of the inventive concepts. This summary is not intended to identify key or essential inventive concepts, nor is it intended for determining the scope of the inventive concepts.

According to embodiments, a solution for the effective management of SNPN parameters and handling of forbidden SNPNs addressing the above-mentioned challenges is provided.

According to embodiments of the present disclosure, a method for managing 5G Mobility Management (5GMM) parameters of a Standalone Non Public Network (SNPN) at a User Equipment (UE) is disclosed. The method includes selecting an SNPN identifier (SNPN ID) from among a plurality of SNPN IDs in a first list, determining whether the first list includes a valid Subscriber Permanent Identifier (SUPI) for the SNPN ID, the first list including a plurality of SNPN parameter values associated with the plurality of SNPN IDs, identifying a first SUPI from a first Universal Subscriber Identifier Module (USIM) of the UE in response to determining that the first list does not include the valid SUPI for the SNPN ID, generating a first SNPN registration request based on the SNPN ID and the first SUPI to attempt registration with a first SNPN associated with the SNPN ID, and updating a second list with the SNPN ID, the first SUPI, and one or more first SNPN parameter values corresponding to the first SNPN upon successful registration with the first SNPN.

According to embodiments of the present disclosure, a method for managing 5GMM parameters of an SNPN at a User Equipment (UE) is disclosed. The method includes selecting an SNPN identifier (SNPN ID) from among a plurality of SNPN IDs in a first list, determining whether the first list includes a valid Subscriber Permanent Identifier (SUPI) for the SNPN ID, the first list including a plurality of SNPN parameter values associated with the plurality of SNPN IDs, identifying a first SUPI from a Universal Subscriber Identifier Module (USIM) of the UE in response to determining that the first list does not include the valid SUPI for the SNPN ID, generating an SNPN registration request based on the SNPN ID and the first SUPI, receiving a registration reject indication from a first SNPN associated with the SNPN ID in response to the SNPN registration request, and updating a second list with the SNPN ID in a forbidden SNPN category based on the registration reject indication.

According to embodiments of the present disclosure, a device for managing 5GMM parameters of an SNPN at a User Equipment (UE) is disclosed. The device includes processing circuitry configured to select an SNPN identifier (SNPN ID) from among a plurality of SNPN IDs in a first list, determine whether the first list includes a valid Subscriber Permanent Identifier (SUPI) for the SNPN ID, the first list including a plurality of SNPN parameter values associated with the plurality of SNPN IDs, identify a first SUPI from a first Universal Subscriber Identifier Module (USIM) of the UE in response to determining that the first list does not include the valid SUPI for the SNPN ID, generate a first SNPN registration request based on the SNPN ID and the first SUPI to attempt registration with a first SNPN associated with the SNPN ID, and update a second list with the SNPN ID, the first SUPI, and one or more first SNPN parameter values corresponding to the first SNPN upon successful registration with the first SNPN.

According to embodiments of the present disclosure, a device for managing 5GMM parameters of an SNPN at a User Equipment (UE) is disclosed. The device includes processing circuitry configured to select an SNPN identifier (SNPN ID) from among a plurality of SNPN IDs in a first list, determine whether the first list includes a valid Subscriber Permanent Identifier (SUPI) for the SNPN ID, the first list including a plurality of SNPN parameter values associated with the plurality of SNPN IDs, identify first SUPI from a Universal Subscriber Identifier Module (USIM) of the UE in response to determining that the first list does not include the valid SUPI for the SNPN ID, generate an SNPN registration request based on the SNPN ID and the first SUPI, receive a registration reject indication from a first SNPN associated with the SNPN ID in response to the SNPN registration request, and update a second list with the SNPN ID in a forbidden SNPN category based on the registration reject indication.

To further clarify the advantages and features of the inventive concepts, a more particular description of the inventive concepts will be rendered by reference to specific examples thereof, which are illustrated in the appended drawings. It is appreciated that these drawings depict only embodiments of the inventive concepts and are therefore not to be considered limiting its scope. The inventive concepts will be described and explained with additional specificity and detail with the accompanying drawings.

BRIEF DESCRIPTION OF THE DRAWINGS

These and other features, aspects, and advantages of the inventive concepts will become better understood when the following detailed description is read with reference to the accompanying drawings in which like characters represent like parts throughout the drawings, wherein.

Figure 1:
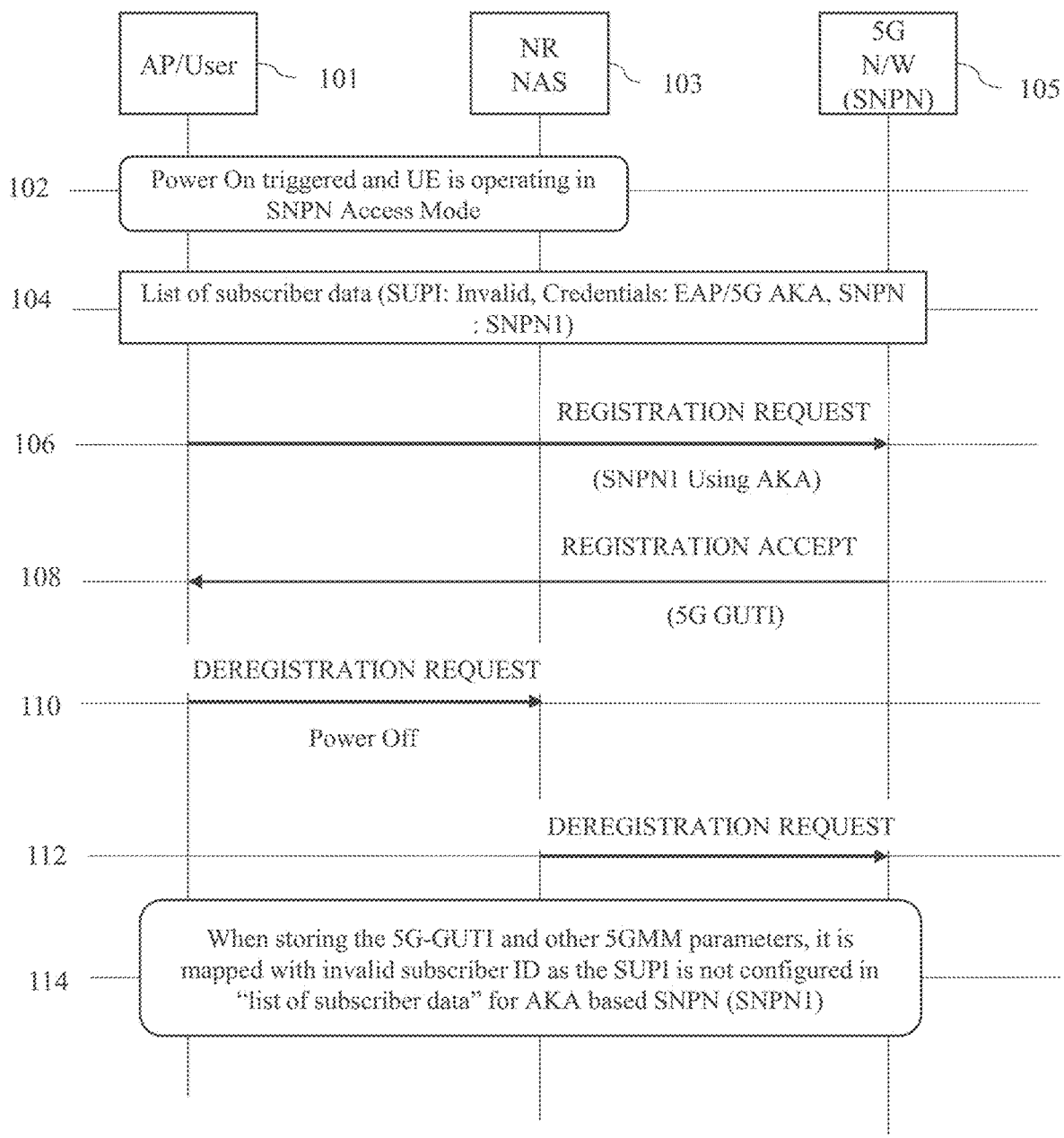
FIG. 1 illustrates a sequence of operations depicting a challenge with AKA-based SNPN with a single USIM, according to state of the art.

Further, skilled artisans will appreciate that elements in the drawings are illustrated for simplicity and may not have been necessarily drawn to scale. For example, the flow charts illustrate the method in terms of prominent operations involved to help to improve understanding of aspects of the inventive concepts. Furthermore, in terms of the construction of the device, one or more components of the device may have been represented in the drawings by conventional symbols, and the drawings may show only those specific details that are pertinent to understanding embodiments of the inventive concepts so as not to obscure the drawings with details that will be readily apparent to those of ordinary skill in the art having the benefit of the description herein.

DETAILED DESCRIPTION

It should be understood at the outset that although illustrative implementations of embodiments of the present disclosure are illustrated below, the inventive concepts may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "embodiments" may refer to no embodiments, to one embodiment, to several embodiments, or to all embodiments. Accordingly, the term "embodiments" is defined as meaning "no embodiment, or one embodiment, or more than one embodiment, or all embodiments."

The terminology and structure employed herein are for describing, teaching, and illuminating embodiments and their specific features and elements and do not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element does NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as, or a similar meaning to, that commonly understood by one having ordinary skill in the art.

The terms "user", "user device", "user equipment", or "UE" may be used interchangeably throughout the description.

Embodiments of the inventive concepts will be described below in detail with reference to the accompanying drawings.

FIG. 1 illustrates a sequence of operations depicting a challenge with Authentication and Key Agreement. (AKA) based Stand-alone Non-Public Network (SNPN) with a single Universal Subscriber Identity Module (USIM), according to state of the art. In this scenario, the sequence of operations corresponds to communication between user device 101 (also referred to as "the user 101" or application processor (AP)), New Radio (NR) at Non-Access Stratum (NAS) layer 103 (referred to as "NR NAS 103"), and the network 105. According to embodiments, references herein to the NR NAS 103 and/or the network 105 may correspond to respective devices (e.g., base stations) configured to implement operations performed by the NR NAS 103 and/or the network 105. The term base station may generally refer to a fixed station that communicates with user equipment and/or other base stations, and may exchange data and control information by communicating with user equipment and/or other base stations. For example, the base station may also be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, or the like. In the present specification, a base station or a cell may be interpreted in a comprehensive sense to indicate some area or function covered by a base station controller (BSC) in CDMA, a Node-B in WCDMA, an eNB in LTE, a gNB or sector (site) in 5G, and the like, and may cover all the various coverage areas such as megacell, macrocell, microcell, picocell, femtocell and relay node, RRH, RU, and small cell communication range. The user device 101 may be a multi Universal Subscriber Identity Module (MUSIM) device. Examples of the user device 101 may include, a smartphone, a tablet, a laptop, a personal computing device, and so forth. Further, the network 105 may correspond to $5^{th}$ Generation (5G) SNPN. Moreover, NR NAS 103 is a protocol layer that may be configured to provide control and management services for the end-to-end communication between the user device 101 and the network 105. The NR NAS 103 may be responsible for various operations such as, but not limited to, authentication, mobility management, and security.

The NR NAS 103 may be configured to handle the communication between the user device 101 and the network 105. The NR NAS 103 may also be configured to provide a common interface between the user device 101 and the various network domains, such as the radio access network (RAN) and the core network (CN). Specifically, the NR NAS 103 may be configured to provide secure, reliable, and efficient communication between the user device 101 and the network 105, and to support the various services and applications offered by the 5G NR networks 105.

The user device (also referred to as the user equipment (UE) 101) may include a single USIM. Further, SNPN may be based on AKA-based authentication. At operation 102, the UE 101 may be powered ON and initialized to operate in SNPN access mode. Further, at operation 104, the user device 101 (may also be referred to as "Mobile Equipment (ME)), prior to installation of the USIM, may be configured with a list of subscriber data which may include information such as, but not limited to, Subscriber Permanent Identity (SUPI), credentials, SNPN, as so forth. The list of subscriber data may also be referred to as an operator-based list of subscriber data (also referred to herein as the "first list"). Further, the UE-based list (and/or the operator-based list) of subscriber data may include information such as, but not limited to, SNPN Identifier (SNPN ID), SUPI, 5G Globally Unique Temporary Identifier (5G-GUTI), allowed slices, authentication keys, temporary forbidden SNPNs, and/or permanently forbidden SNPNs. Operation 106 may correspond to the initialization of registration of USIM included in UE 101 with an SNPN to perform communication with the network 105. Specifically, the UE 101 may generate a "registration request" message to subscribe the USIM with an SNPN with ID1 (also referred as SNPN1) using AKA-based authentication. Upon acceptance of the "registration request" message, the network 105 may transmit the "registration accept" message along the 5G-GUTI information, as shown in operation 108. The 5G-GUTI may be a temporary identifier assigned to the UE 101 by the network 105. The 5G-GUTI may be used to identify the UE 101 within the network 105. The 5G-GUTI may be used in combination with other identifiers, such as, but not limited to, the SUPI, to manage the UE's mobility within the network 105. Further, operations 110-112 may correspond to the deregistration process. Specifically, at operation 110, the UE 101 may generate a "deregistration request" message. The "deregistration request" message may be transmitted to the network 105 via the NR NAS 103, as shown in operation 112.

Further, for every registration process, the UE 101 may store and/or update 5G-GUTI and 5GMM parameters, as received from the network 105. Thus, the UE 101 may maintain a record of each of the SNPN and corresponding 5G-GUTI and 5GMM parameters. The stored record of SNPNs and corresponding 5G-GUTI and 5GMM parameters may be utilized by the UE 101 to establish future communication connection. The network 105 may utilize the 5G-GUTI to uniquely identify the UE 101 within the network 105. Further, the 5GMM parameters may be used by the UE 101 to manage the mobility of the UE 101. However, when storing the 5G-GUTI and 5GMM parameters, the UE 101 may map the selected SNPN with an invalid subscriber ID (SUPI), as the SUPI value may be referred from the list of subscriber data where SUPI may not be configured as the SNPN is AKA based SNPN (SNPN1), as shown in operation 114. Particularly, such a list of subscriber data may be defined by an operator and/or vendor of the network 105 and the SUPI value may not be defined as the SNPN subscription may be performed using the AKA-based authentication. Thus, the UE 101 may store the invalid SUPI corresponding to the selected SNPN which may lead to issues in connecting and establishing a connection with the SNPN for future communication.

Figure 2:
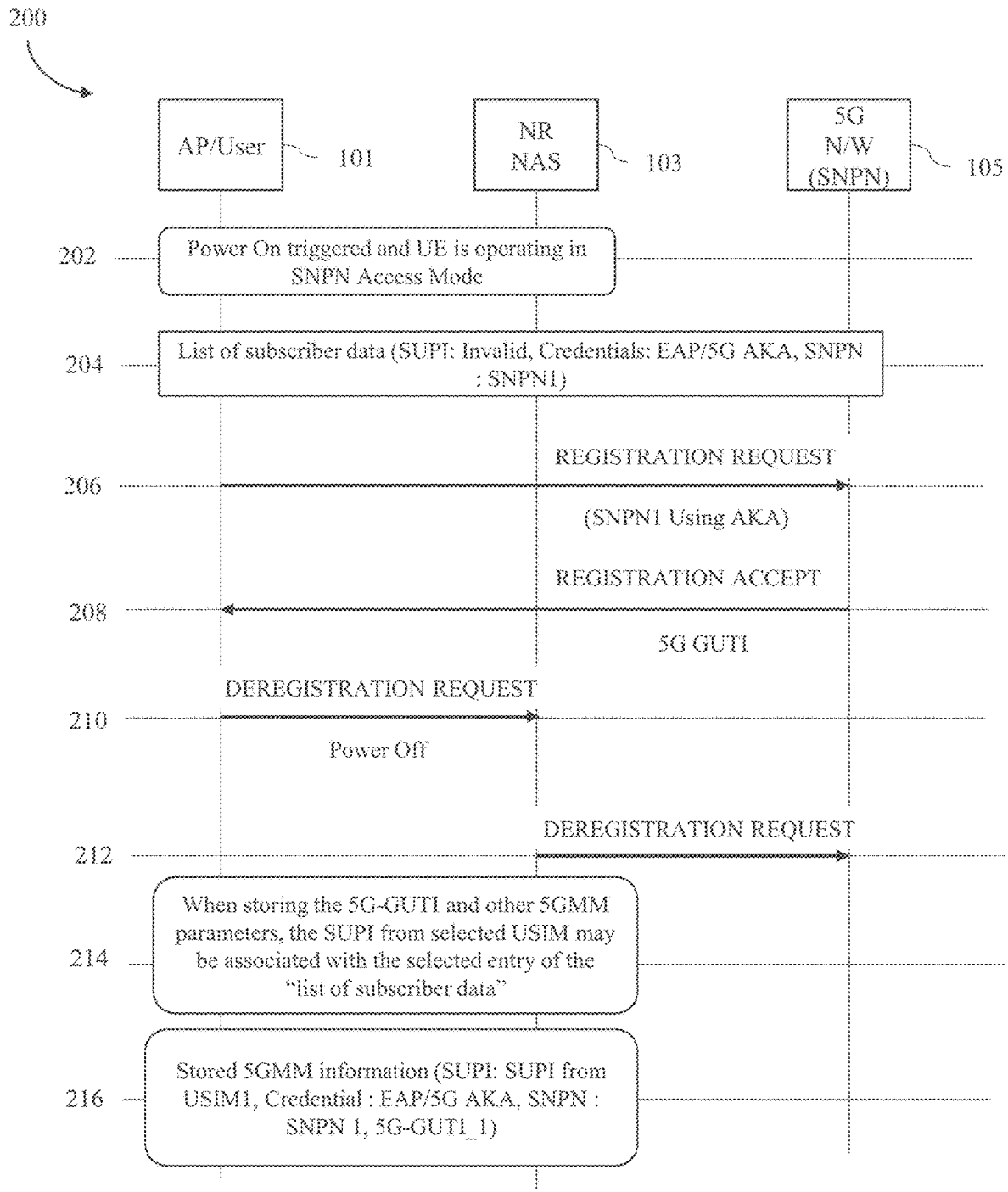
FIG. 2 illustrates an example process flow depicting a method for addressing the challenge illustrated in FIG. 1, according to embodiments of the present disclosure.

FIG. 2 illustrates an example process flow depicting a method 200 for addressing the challenge illustrated in FIG. 1, according to embodiments of the present disclosure. The operations of the method 200 may be performed by the UE 101 and/or the network 105, which may be communicably coupled via the NR NAS 103 protocol layer. Some of the operations illustrated in FIG. 2 are similar to operations illustrated in FIG. 1, and accordingly, similar reference numerals have been assigned to corresponding operations. Specifically, operations 202-212 are similar to operations 102-112, and therefore a description of these operations has been omitted for the sake of brevity.

Specifically at operation 214, while maintaining the record of the selected SNPN and corresponding 5G-GUTI and 5GMM parameters, instead of selecting the SUPI value from the list of subscriber data as may be defined by the operator and/or vendor, the method 200 may include retrieving a valid SUPI value from the selected USIM which is used for the registration process. The UE 101 may associate the retrieved SUPI value with the selected entry of "list of subscriber data". Thus, the UE 101 may store 5G Mobility Management (5GMM) parameters which may include a valid SUPI e.g., SUPI from USIM 1, credential information (for example EAP/5G AKA), SNPN value (for example SNPN1), and 5G-GUTI (e.g., 5G-GUTI_1 corresponding to SNPN1), as shown in operation 216. In embodiments, the UE 101 may utilize the stored information of the 5GMM parameters for future communication with the selected SNPN.

Thus, the method 200 may prevent the UE 101 from associating the selected SNPN with an invalid SUPI, and/or reduce the occurrence thereof, and thereby resolve and/or reduce the issues in a subscription that may arise due to an invalid SUPI.

Figure 3:
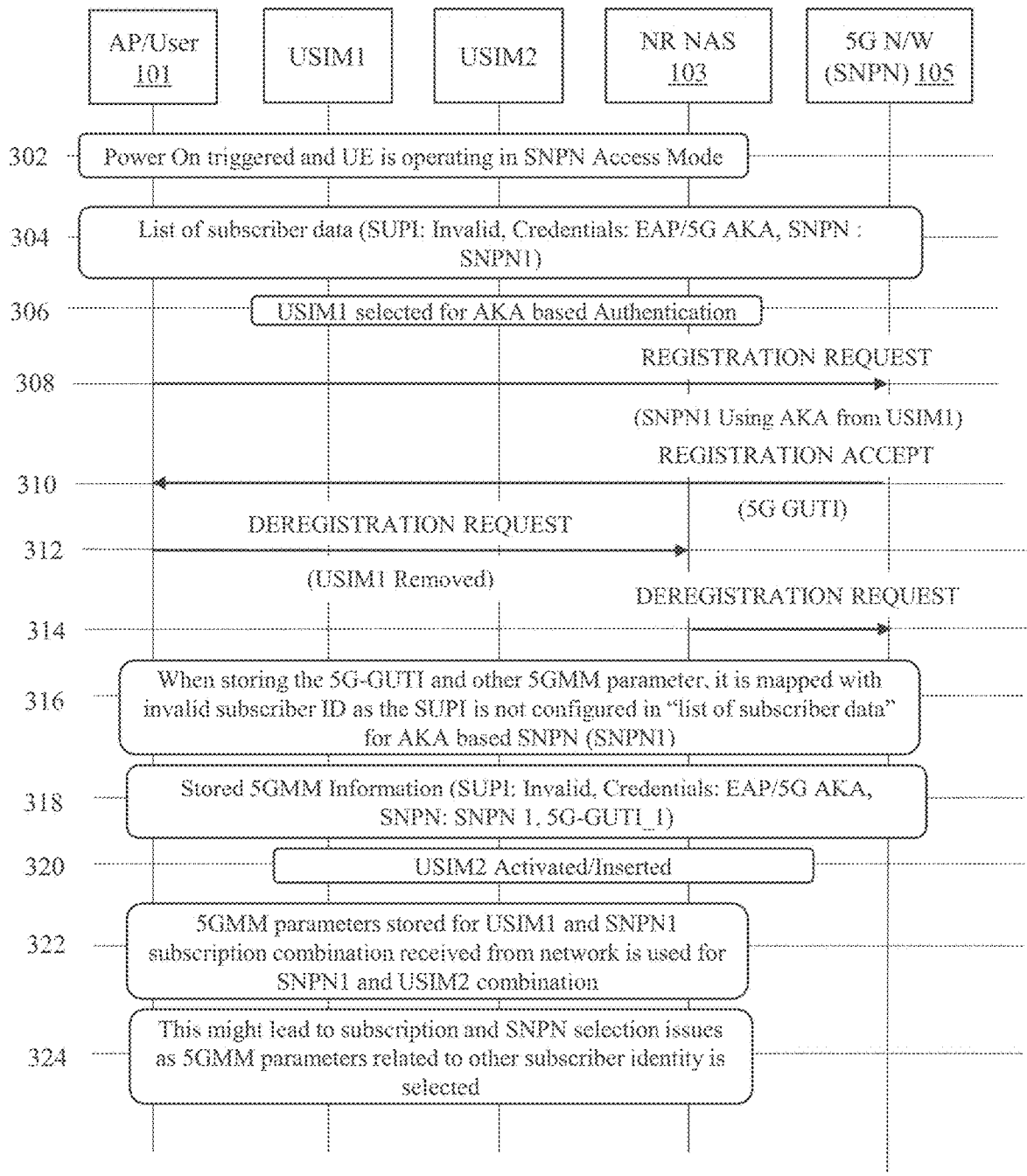
FIG. 3 illustrates a sequence of operations depicting a challenge associated with AKA-based SNPN in a multi-SIM scenario, according to state of the art.

FIG. 3 illustrates a sequence of operations depicting a challenge associated with AKA-based SNPN in a multi-USIM scenario, according to the state of the art. In this scenario, the sequence of operations corresponds to a communication between the UE 101, the NR NAS 103, and the network 105. The user device 101 may be a MUSIM device. In examples, the UE 101 may be a dual USIM device that includes a USIM1 and a USIM2.

At operation 302, the UE 101 may be powered ON and initialized to operate in SNPN access mode. Further, at operation 304, the user device 101 (may also be referred to as "Mobile Equipment (ME)), prior to installation of USIM, may be configured with a list of subscriber data which may include information such as, but not limited to, Subscriber Permanent Identity (SUPI), credentials, SNPN, as so forth. At operation 306, the USIM1 may be selected for AKA-based authentication for an SNPN. Operations 308-310 may correspond to the registration process of USIM1 with the SNPN to perform communication with the network 105. Specifically, the UE 101 may generate a "registration request" message to subscribe the USIM1 with an SNPN with ID1 (also referred as SNPN1) using AKA-based authentication, as shown in operation 308. Upon acceptance of the "registration request" message, the network 105 may transmit the "registration accept" message along with the 5G-GUTI information, as shown in operation 310.

Further, if USIM1 is removed, the UE may initiate a deregistration process to offload the network 105. Operations 312-314 may correspond to the deregistration process. Specifically, at operation 312, the UE 101 may generate a "deregistration request" message. The "deregistration request" message may be transmitted to the network 105 via the NR NAS 103, as shown in operation 314. Further, the USIM1 may be removed in operation 312.

However, as a process of maintaining a record of each subscribed SNPN, when storing the 5G-GUTI and/or other 5GMM parameters, the UE 101 may map the selected SNPN with an invalid subscriber ID (SUPI), as the SUPI value may be referred from the list of subscriber data where SUPI may not be configured as the SNPN is AKA based SNPN (SNPN1), as shown in operations 316-318. Thus, the UE 101 may store invalid SUPI corresponding to the selected SNPN which may lead to issues in connecting and establishing a connection with the SNPN for future communication.

Next at operation 320, the USIM2 may be inserted and/or activated. Therefore, the UE 101 may initiate the registration and/or subscription process for the USIM2 to initialize the communication of USIM2 with the network 105. Specifically, at operation 322, the UE 101 may retrieve the 5GMM parameters corresponding to the USIM1 and the SNPN1 subscription combination from the network 105. Further, the UE 101 may use the received 5GMM parameters corresponding to the USIM1 and the SNPN1 subscription for the subscription of the USIM2 and the SNPN1, as shown in operation 322. However, the use of 5GMM parameters corresponding to USIM1 and SNPN1 for the USIM2 and SNPN1 may lead to subscription and SNPN selection issues, as the 5GMM parameters are related to another subscriber identity (e.g., USIM1), as shown in operation 324. Thus, the invalid selection of 5GMM parameters may lead to wastage of resources and time while subscribing to an SNPN.

Figure 4:
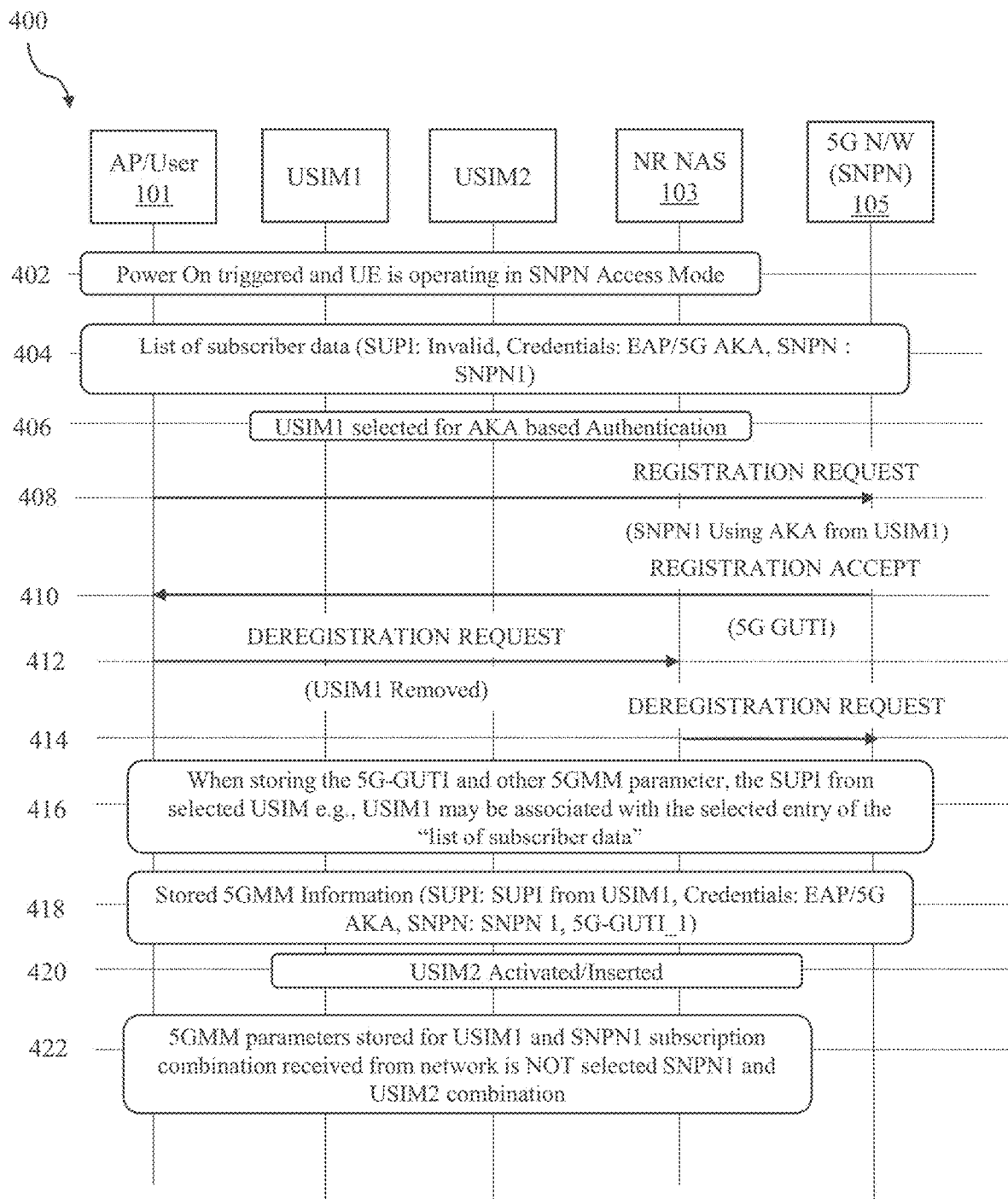
FIG. 4 illustrates an example process flow depicting a method for addressing the challenge illustrated in FIG. 3, according to embodiments of the present disclosure.

FIG. 4 illustrates an example process flow depicting a method 400 for addressing the challenge illustrated in FIG. 3, according to embodiments of the present disclosure. The operations of the method 400 may be performed by the UE 101 and/or the network 105, which may be communicably coupled via the NR NAS 103. The operations of the method 400 which are similar to the operations illustrated in FIG. 3, are provided with similar reference numerals. Specifically, operations 402-414 are similar to operations 302-314, therefore a description of these operations has been omitted for the sake of brevity.

Specifically, at operation 416, while maintaining the record of the selected SNPN and corresponding 5G-GUTI and 5GMM parameters, instead of selecting the SUPI value from the list of subscriber data which includes invalid SUPI for AKA based SNPN, the method 400 may include retrieving a valid SUPI value from the selected USIM which is used for the registration process. Further, the UE 101 may associate the retrieved SUPI value with the selected entry of "list of subscriber data". Thus, the UE 101 may store 5G Mobility Management (5GMM) parameters which may include a valid SUPI e.g., SUPI from USIM 1, credential information (for example EAP/5G AKA), SNPN value (for example SNPN1), and 5G-GUTI, as shown in operation 418. Further, at operation 420, the USIM2 may be inserted and/or activated. Here, at operation 422, when performing registration using USIM2, instead of selecting 5GMM parameters corresponding to USIM1 and SNPN1 combination for USIM2 and SNPN1, the method 400 may include performing the complete registration operations as performed for USIM1. Thus, the method 400 may avoid or reduce subscription and SNPN selection issues as 5GMM parameters related to other subscriber identity are not selected. Thus, the method 400 helps in saving resource and time for the UE 101 and/or the network 105.

Figure 5:
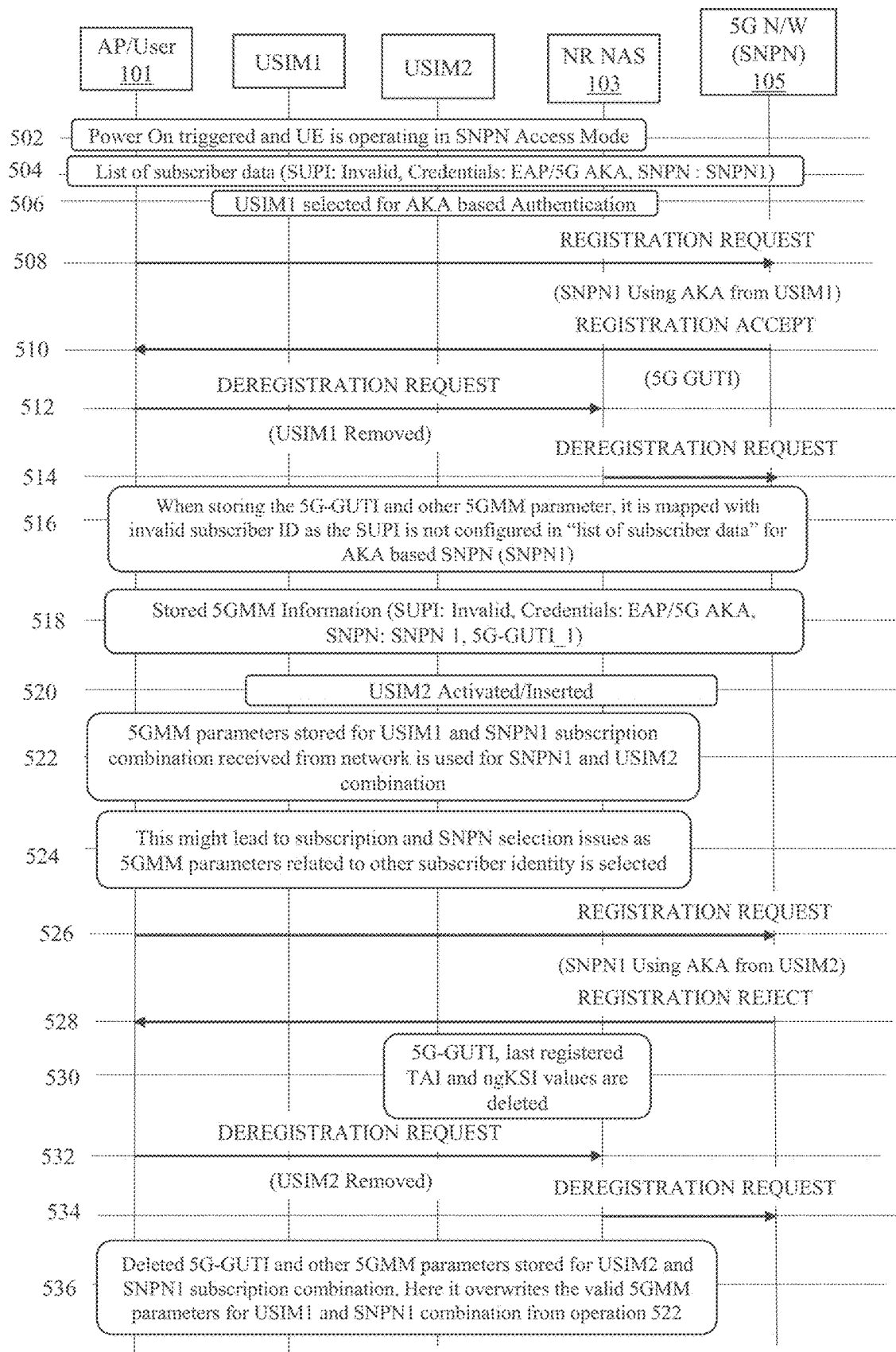
FIG. 5 illustrates a sequence of operations depicting a challenge associated with AKA-based SNPN in a multi-SIM scenario, according to state of the art.

FIG. 5 illustrates a sequence of operations depicting a challenge associated with AKA-based SNPN in a multi-SIM scenario, according to the state of the art. In this scenario, the sequence of operation corresponds to a communication between the UE 101, the NR NAS 103, and the network 105. In examples, the UE 101 may be a dual USIM device that includes the USIM1 and the USIM2, as also shown in FIG. 3.

Further, operations 502-524 are similar to the operations 302-324, as explained in reference to FIG. 3, thus a description of these operations has been omitted for the sake of brevity. Specifically, after receiving 5GMM parameters corresponding to USIM1 and SNSPN1, the UE 101 may initiate the registration process for USIM2 with SNPN1 using the received parameters, as shown in operation 526. As the 5GMM parameters used for the registration process relates to another subscriber identity, the registration request may be rejected by the network 105, as shown in operation 528. At operation 530, the 5G-GUTI, last registered Tracking Area Identity (TAI), and next generation Key Set Identifier (ngKSI) value may be deleted, in response to the registration reject indication. At operations 532-534, the UE 101 may initiate a deregistration request and USIM2 may be removed from the UE 101. At operation 536, while maintaining the record of the selected SNPN and the deleted 5G-GUTI and other 5GMM parameters, the UE 101 may map the selected SNPN with an invalid SUPI, as the SUPI may be referred from the list of subscriber data where the SUPI is not configured for SNPN1. Further, the previously stored valid 5GMM parameters for USIM1 and SNPN1 combination may be overwritten, as shown in operation 536. Thus, the UE 101 may unnecessarily overwrite the invalidated information over the valid information of an SNPN. This may lead to subscription and connection issues with the selected SNPN in future communication. Particularly, the UE 101 may re-perform the complete registration for the selected SNPN with new 5G-GUTI and 5GMM parameters as a result of the overwrite.

Figure 6:
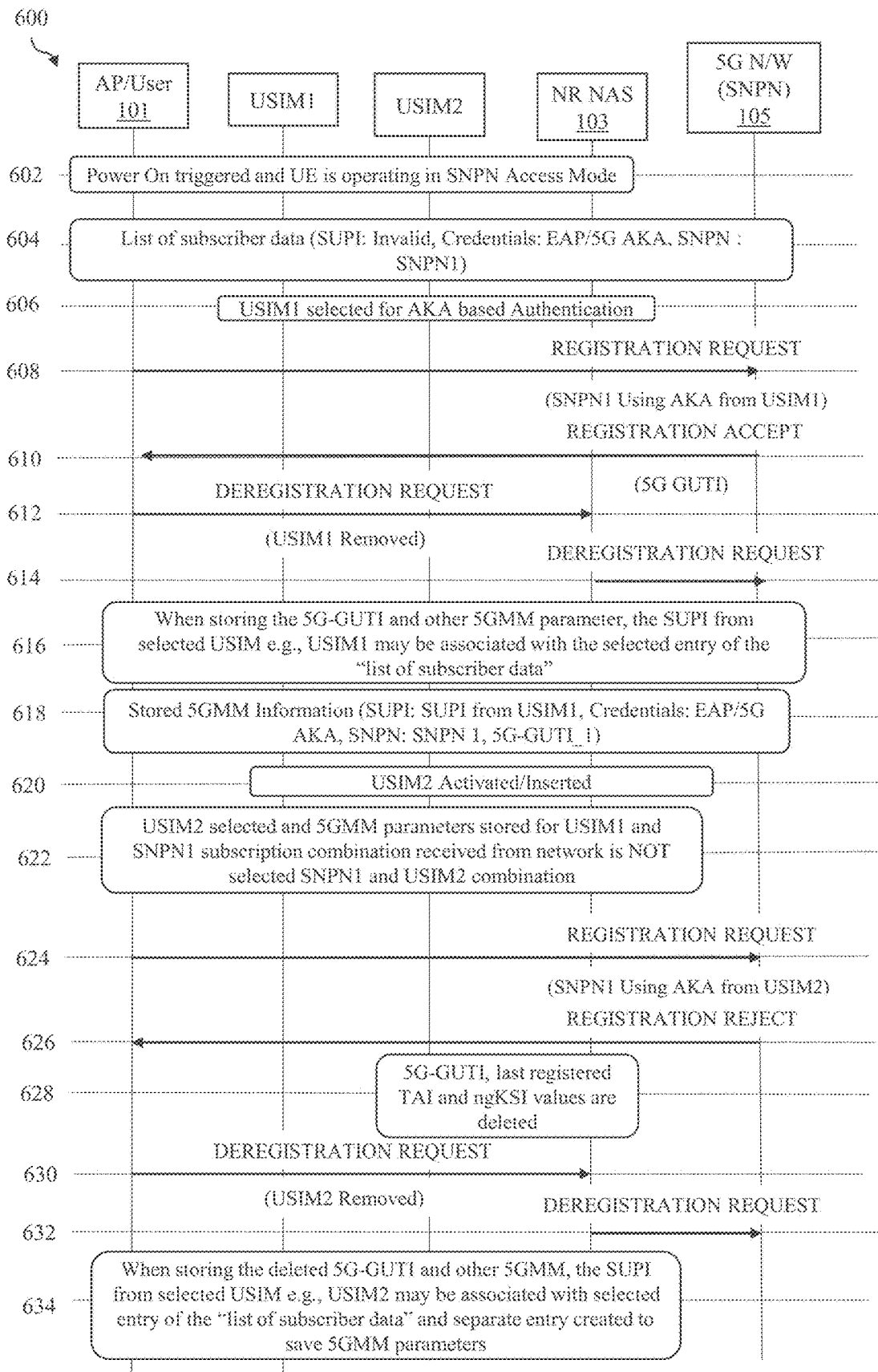
FIG. 6 illustrates a sequence of operations of a method for addressing the challenge illustrated in FIG. 5, according to embodiments of the present disclosure.

FIG. 6 illustrates a sequence of operation of a method 600 for addressing the challenge illustrated in FIG. 5, according to embodiments of the present disclosure. The operations of the method 600 may be performed by the UE 101 and the network 105, which may be communicably coupled via the NR NAS 103. The operations of the method 600 which are similar to operations illustrated in FIG. 5 are provided with similar reference numerals. Specifically, operations 602-614 are similar to operations 502-514, therefore the description of these operations has been omitted for the sake of brevity.

Specifically, at operation 616, while maintaining the record of the selected SNPN and corresponding 5G-GUTI and 5GMM parameter, instead of selecting the SUPI value from the list of subscriber data which includes invalid SUPI for AKA-based SNPN, the method 600 may include retrieving a valid SUPI value from the selected USIM which is used for the registration process (e.g., USIM1). Further, the method 600 may include associating the retrieved SUPI value with the selected entry of "list of subscriber data". Thus, the UE 101 may store 5G Mobility Management (5GMM) parameters which may include a valid SUPI, e.g., SUPI from USIM1, credential information (for example EAP/5G AKA), SNPN value (for example SNPN1), and 5G-GUTI, as shown in operation 618. Further, at operation 620, the USIM2 may be inserted and/or activated. Here, at operation 622, when performing registration using USIM2, instead of selecting 5GMM parameters corresponding to USIM1 and SNPN1 combination for USIM2 and SNPN1, the method 600 may include performing the complete registration operations as performed for USIM1. Thus, the method 600 may avoid or reduce subscription and SNPN selection issues as 5GMM parameters related to another subscriber identity are not selected. At operation 624, the method 600 includes performing a registration process for USIM2 with the SNPN1. At operation 626, the network 105 may reject the registration request. At operation 628, the 5G-GUTI, last registered Tracking Area Identity (TAI), and Key Set Identifier (ngKSI) value may be deleted, in response to the registration reject indication. At operations 630-632, the UE 101 may initiate a deregistration request and USIM2 may be removed from the UE 101. At operation 634, when storing the deleted 5G-GUTI and other 5GMM parameters, the UE 101 may select the SUPI value from USIM e.g., USIM2, and associate the selected SUPI with the selected entry of the "list of subscriber data". Further, the UE 101 may create a separate entry to store the corresponding 5GMM parameters. This prevents overwriting of any valid entry in the UE-based list of subscriber data stored at the UE 101, or reduces the occurrence thereof.

Thus, the method 600 may avoid or reduce subscription and SNPN selection issues, as invalid 5GMM parameters may not be selected and/or stored at UE 101.

Figure 7A:
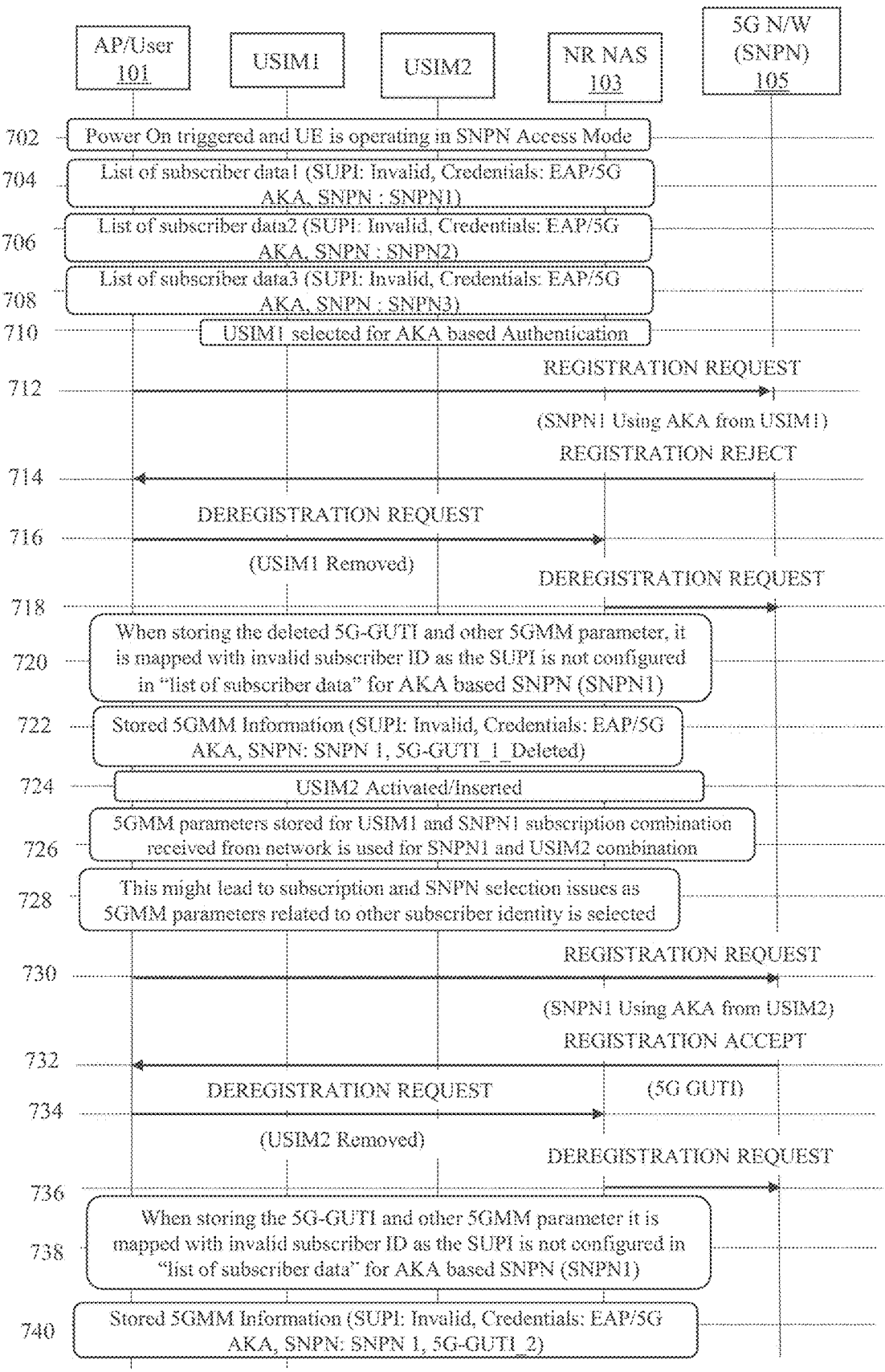
FIGS. 7A-7C illustrate a sequence of operations depicting a challenge associated with AKA-based SNPN in a multi-SIM scenario, according to state of the art.
Figure 7B:
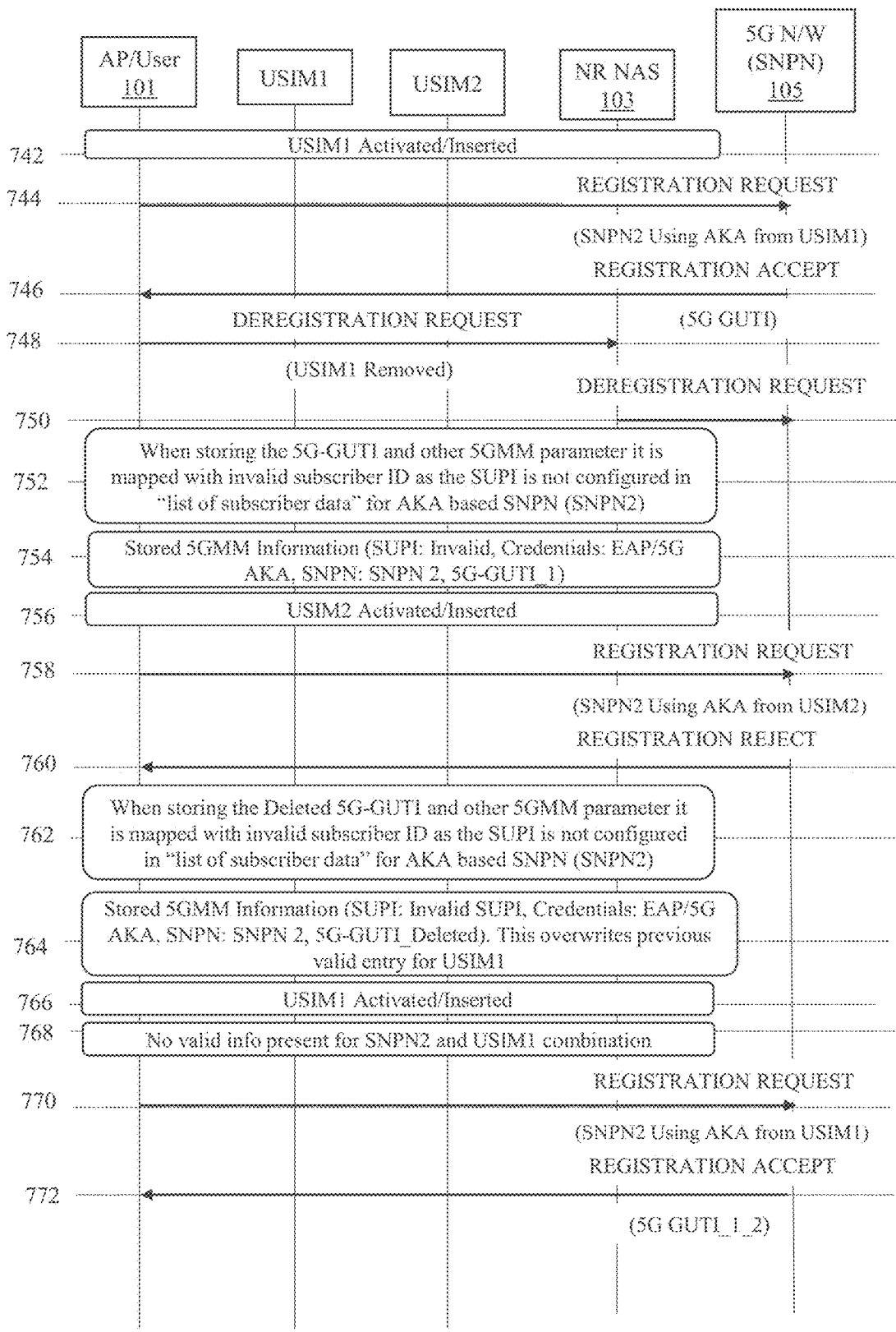
Figure 7C:
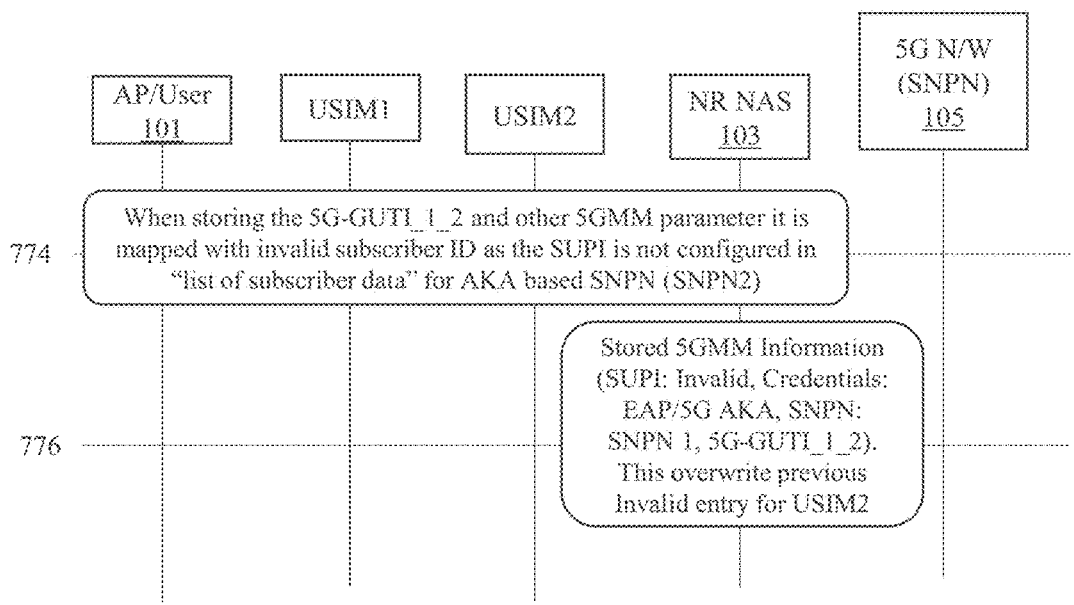

FIGS. 7A-7C illustrate a sequence of operations depicting a challenge associated with AKA-based SNPN in a multi-SIM scenario, according to state of art. In this scenario, the sequence of operation corresponds to a communication between the UE 101, the NR NAS 103, and the network 105. In an example, the UE 101 may be a dual SIM device that includes the USIM1 and the USIM2.

At operation 702, the UE 101 may be powered ON and initialized to operate in SNPN access mode. Further, at operations 704-708, the user device 101 (may also be referred to as "Mobile Equipment (ME)), prior to installation of a SIM, may be configured with a list of subscriber data for multiple SNPNs (for example data1 corresponding to SNPN1, data2 for SNPN2, and data3 for SNPN3).

At operation 710, the USIM1 may be selected for AKA-based authentication for SNPN. Next, at operation 712, the network 105 may reject the registration request. The network 105 may reject registration requests based on criteria such as, but not limited to, invalid SUPI, invalid authentication, resource unavailability, unauthorized access to selected SNPN, and so forth. At operations 716-718, the UE 101 may perform the deregistration request and USIM1 may be removed. However, while maintaining the record of the selected SNPN and corresponding 5G-GUTI and 5GMM parameters, the UE 101 may map the selected SNPN with an invalid subscriber ID (SUPI), as the SUPI value may be referred from the list of subscriber data where SUPI may not be configured as the SNPN is AKA based SNPN (SNPN1), as shown in operation 720-722. Thus, the UE 101 may store invalid SUPI corresponding to the selected SNPN which may lead to issues in connecting and establishing a connection with the SNPN for future communication.

Next at operation 724, the USIM2 may be inserted and/or activated. At operation 726, the UE 101 may retrieve the 5GMM parameters corresponding to the USIM1 and the SNPN1 subscription combination from the network 105. Further, the UE 101 may use the same (or similar) received 5GMM parameters corresponding to the USIM1 and the SNPN1 subscription for the USIM2 and SNPN1 combination. However, the use of 5GMM parameters corresponding to USIM1 and SNPN1 for the USIM2 and SNPN1 may lead to subscription and SNPN selection issues, as the 5GMM parameters are related to another subscriber identity (e.g., USIM1) is selected, as shown in operation 728. At operation 730, the UE 101 may initiate a registration process for USIM2 with SNPN1 using AKA. As the previous registration request by USIM1 was rejected by the network 105, the network 105 may accept the registration request from USIM2 and transmit 5G GUTI, as shown in operation 732.

Next at operations 734-736, the UE 101 may perform the deregistration request and USIM2 may be removed. However, while maintaining the record of the selected SNPN and corresponding 5G-GUTI and 5GMM parameters, the UE 101 may map the selected SNPN with an invalid subscriber ID (SUPI), as the SUPI value may be referred from the list of subscriber data where SUPI may not be configured as the SNPN is AKA based SNPN (SNPN1), as shown in operations 738-740. Thus, the UE 101 may store invalid SUPI corresponding to the selected SNPN which may lead to issues in connecting and establishing a connection with the SNPN for future communication.

At operation 742, the USIM1 may be inserted and/or activated. At operation 744, the UE 101 may initiate registration process for SNPN2 using AKA from USIM1. At operation 746, the network 105 may accept the registration request and transmit 5G-GUTI information. Thereafter, at operation 748-750, the UE 101 may perform the deregistration request and USIM1 may be removed. However, while maintaining the record of the selected SNPN and corresponding 5G-GUTI and 5GMM parameters, the UE 101 may map the selected SNPN with an invalid subscriber ID (SUPI), as the SUPI value may be referred from the list of subscriber data where SUPI may not be configured as the SNPN is AKA based SNPN (SNPN2), as shown in operation 752-754. Thus, the UE 101 may store invalid SUPI corresponding to an SNPN which may lead to issues in connecting and establishing a connection with the SNPN for future communication.

Next at operation 756, the USIM2 may be activated and/or inserted in the UE 101. At operation 758, the UE 101 may initiate a registration process for SNPN2 using AKA from USIM2. At operation 760, the network 105 may reject the registration request, as an invalid SUPI configured for SNPN2 may be used for the registration process. However, while maintaining the record of the selected SNPN and corresponding 5G-GUTI and 5GMM parameters, the UE 101 may map the selected SNPN with an invalid subscriber ID (SUPI), as the SUPI value may be referred from the list of subscriber data where SUPI may not be configured as the SNPN is AKA based SNPN (SNPN2), as shown in operations 762-764. Thus, the UE 101 may overwrite the previous valid entry for USIM1.

At operation 766, the USIM1 may be activated and/or inserted. At operation 768, the UE 101 may determine whether there is any valid information stored for SNPN2 and USIM1 combination. Since, no valid information is found for SNPN2 and USIM1 combination, a new registration process is initiated, as illustrated in operations 770-772. However, while maintaining the record of the selected SNPN and corresponding 5G-GUTI and 5GMM parameters, the UE 101 may map the selected SNPN with the invalid subscriber ID (SUPI), as the SUPI value may be referred from the list of subscriber data where SUPI may not be configured as the SNPN is AKA based SNPN (SNPN2), as shown in operations 774-776. Thus, the UE 101 may overwrite the previous invalid entry for USIM2.

Thus, the state of the art fails to effectively manage 5GMM information corresponding to multi-USIM configuration for SNPN.

Figure 8A:
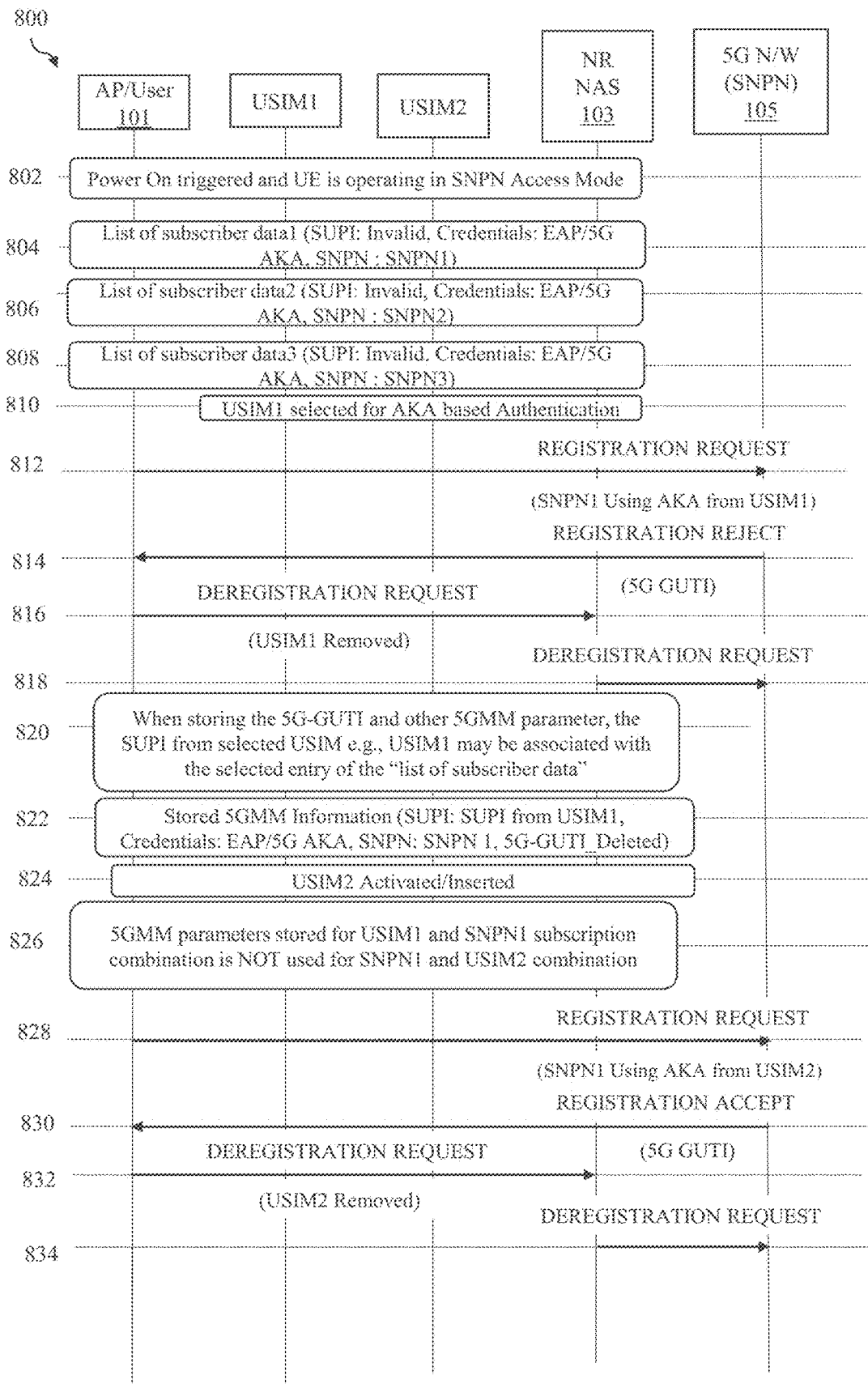
FIGS. 8A-8C illustrate a sequence of operations of a method for addressing the challenge illustrated in FIGS. 7A-7C, according to embodiments of the present disclosure.
Figure 8B:
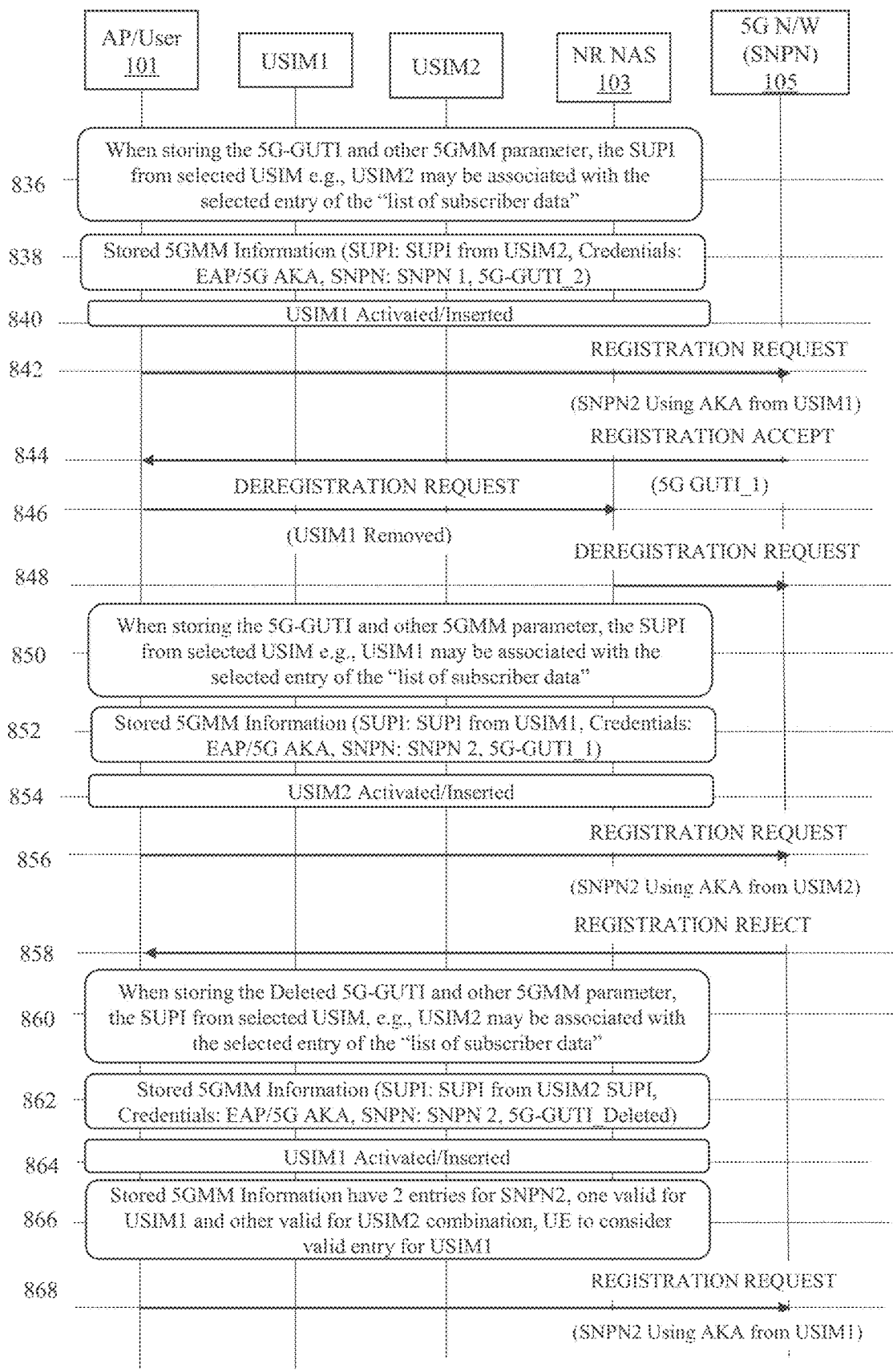
Figure 8C:
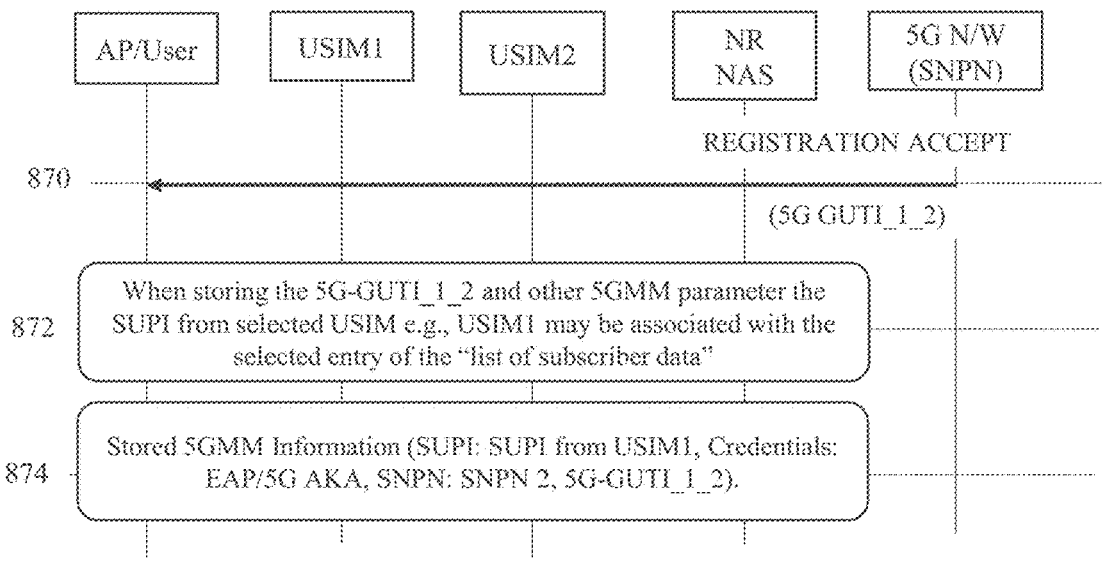

FIGS. 8A-8C illustrate a sequence of operations of a method 800 for addressing the challenge illustrated in FIGS. 7A-7C, according to embodiments of the present disclosure. The operations of the method 800 may be performed by the UE 101 and the network 105, which may be communicably coupled with each other via the NR NAS 103. The operations 802-818 of the method 800 are similar to the operations discussed in FIGS. 7A-7C, therefore only distinct operations have been explained in detail in reference to FIGS. 8A-8C for the sake of brevity.

Specifically, at operation 820, while maintaining the record of the selected SNPN and corresponding 5G-GUTI and 5GMM parameters, the UE 101 may retrieve a valid SUPI value from the USIM1. Further, the UE 101 may associate the retrieved SUPI value with the selected entry of the "list of subscriber data", as shown in operation 822.

Further, at operation 824, when USIM2 is activated and/or inserted, instead of selecting 5GMM parameters stored of USIM1 and SNPN1 for performing registration of USIM2 with the SNPN1, the UE 101 may perform the complete registration and/or deregistration process as previously done for USIM1, shown in operations 826-834. Specifically, the UE 101 may retrieve 5GMM parameters for the registration of USIM with the selected SNPN e.g., SNPN1. Moreover, at operation 836, while maintaining the record of the selected SNPN and corresponding 5G-GUTI and 5GMM parameters for USIM2, the UE 101 may retrieve a valid SUPI from the USIM2. Further, the UE 101 may associate the retrieved SUPI value with the selected entry of the "list of subscriber data", as shown in operation 838.

Moreover, similar operations may be performed each time UE 101 tries to register using any of USIM1 and/or USIM2 with any of the SNPNs (e.g., SNPN1, SNPN2, or SNPN3). Specifically, the UE 101 may effectively store 5GMM parameters for each registration and deregistration process for each USIM installed/included in the UE 101, as shown in operations 840-874. According to embodiments, list of subscriber data may include SNPN parameters (e.g., 5GMM parameters) for each combination of SNPN ID, SUPI and USIM. Therefore, the method 800 may prevent or reduce conflict of entries in the list of subscriber data stored at the UE 101. Thus, the method 800 may provide an effective way to subscribe and select SNPNs while the UE 101 is operating in SNPN access mode.

Figure 9:
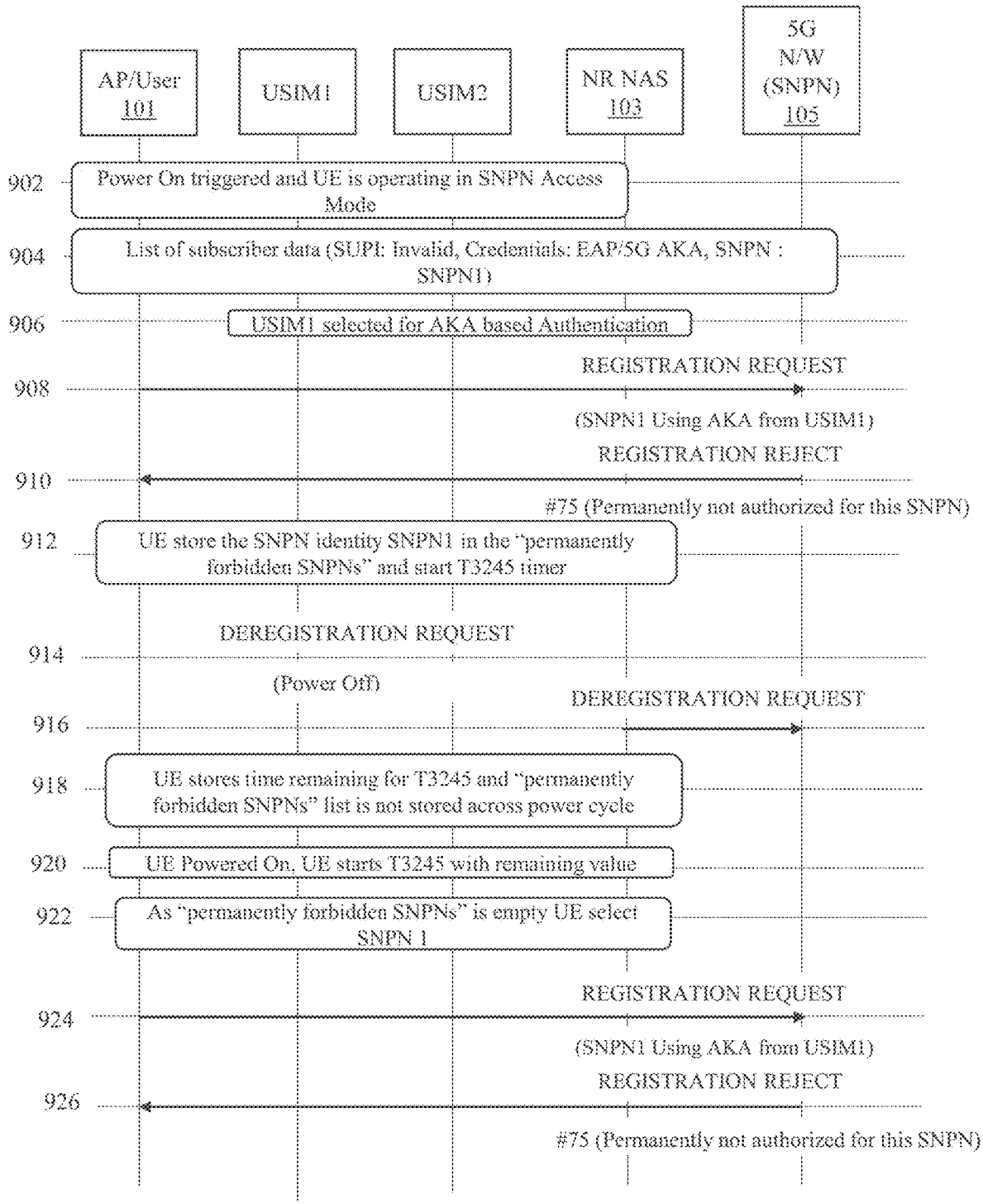
FIG. 9 illustrates a sequence of operations depicting a challenge associated with AKA-based SNPN in a multi-SIM scenario, according to state of the art.

FIG. 9 illustrates a sequence of operations depicting challenge associated with AKA-based SNPN in a multi-SIM scenario, according to state of art. In this scenario, the sequence of operation corresponds to a communication between the UE 101, the NR NAS 103, and the network 105. The user device 101 may be a MUSIM device. In examples, the UE 101 may be a dual SIM device that includes the USIM1 and the USIM2.

At operation 902, the UE 101 may be powered ON and initialized to operate in SNPN access mode. Further, at operation 904, the user device 902 (may also be referred as "Mobile Equipment (ME)), prior to installation of a SIM, may be configured with a list of subscriber data which may include information such as, but not limited to, Subscriber Permanent Identity (SUPI), credentials, SNPN, as so forth. At operation 906, the USIM1 may be selected for AKA-based authentication. At operation 908, the registration request may be initiated to register USIM1 with SNPN1 using AKA. At operation 910, the network 105 may permanently reject the registration request for USIM1 for not being authorized to access SNPN1. At operation 912, the UE 101 may store the SNPN identity (e.g., SNPN1) in a "permanently forbidden SNPNs" list and start a timer. In examples, the timer may be a T3245 timer. At operation 914, the UE 101 may initiate the deregistration process and may switch off the power. At operation 916, the deregistration request may be transmitted to the network 105 via the NR NAS 103. However, the UE 101 may only store time remaining for the T3245 timer across power cycles and fails to store a list of "permanently forbidden SNPNs", as indicated by operation 918. Thus, when the UE 101 is powered on, the UE 101 starts the timer T3245 with the remaining value of time, as shown by operation 920. However, as shown in operation 922, the "permanently forbidden SNPNs" list may not include any entry, and therefore the UE 101 may re-select the previously selected SNPN (for example SNPN1) for registration, as illustrated in operations 922-924. Thus, the network 105 may again reject the request as USIM1 is not authorized to subscribe to SNPN1. This may lead to wastage of time and resources during the subscription of a USIM with an SNPN.

Figure 10:
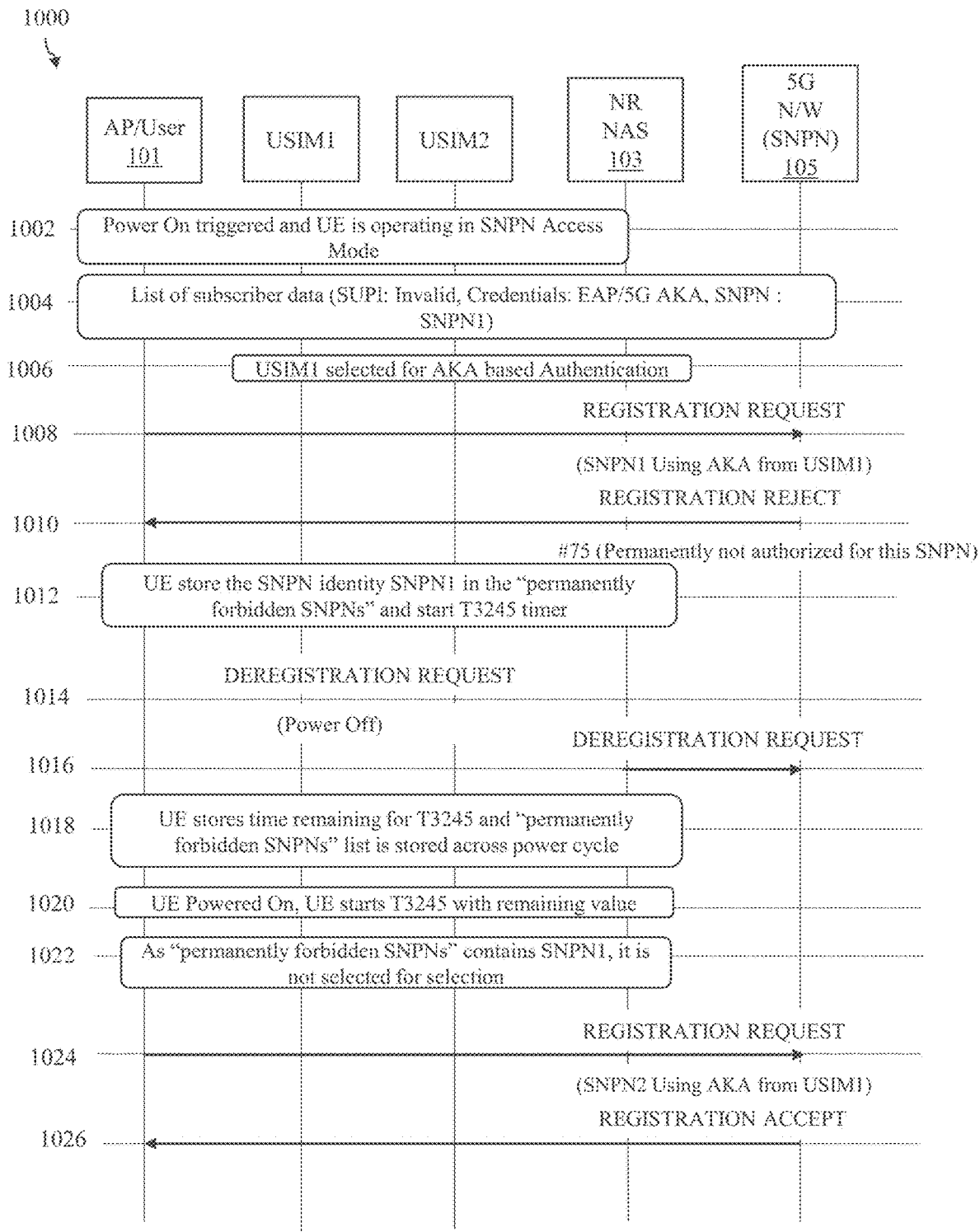
FIG. 10 illustrates a sequence of operations of a method for addressing the challenge illustrated in FIG. 9, according to embodiments of the present disclosure.

FIG. 10 illustrates a sequence of operation of a method 1000 for addressing the challenge illustrated in FIG. 9, according to embodiments of the present disclosure. The operations of the method 1000 may be performed by the UE 101 and the network 105, which may be communicably coupled with each other via the NR NAS 103. Operations 1002-1016 of the method 1000 are similar to the operations 902-916 discussed in FIG. 9, therefore only distinct operations have been explained in detail in reference to FIG. 10 for the sake of brevity.

Specifically, at operation 1018, instead of only storing the remaining value of the timer T3245 across power cycles, as previously done at operation 918, the UE 101 may also store the list of "permanently forbidden SNPNs" across power cycles. In embodiments, the UE 101 may store the remaining value of the timer and the list of "permanently forbidden SNPNs" in a non-volatile memory of the UE 101. Therefore, at operation 1022, the UE 101 may not select SNPN1 for subscription as SNPN1 may be stored in the list of "permanently forbidden SNPNs". Specifically, before generating any registration request, the UE 101 may check the list of "permanently forbidden SNPNs" and make the selection of SNPN, accordingly. As the UE 101 may correctly select the SNPN, the USIM1 may successfully register with SNPN2, as shown in operations 1024-1026.

Therefore, the method 1000 may prevent or reduce the lack of access to normal services, and the wastage of resources and time, while subscribing to an SNPN.

Figure 11:
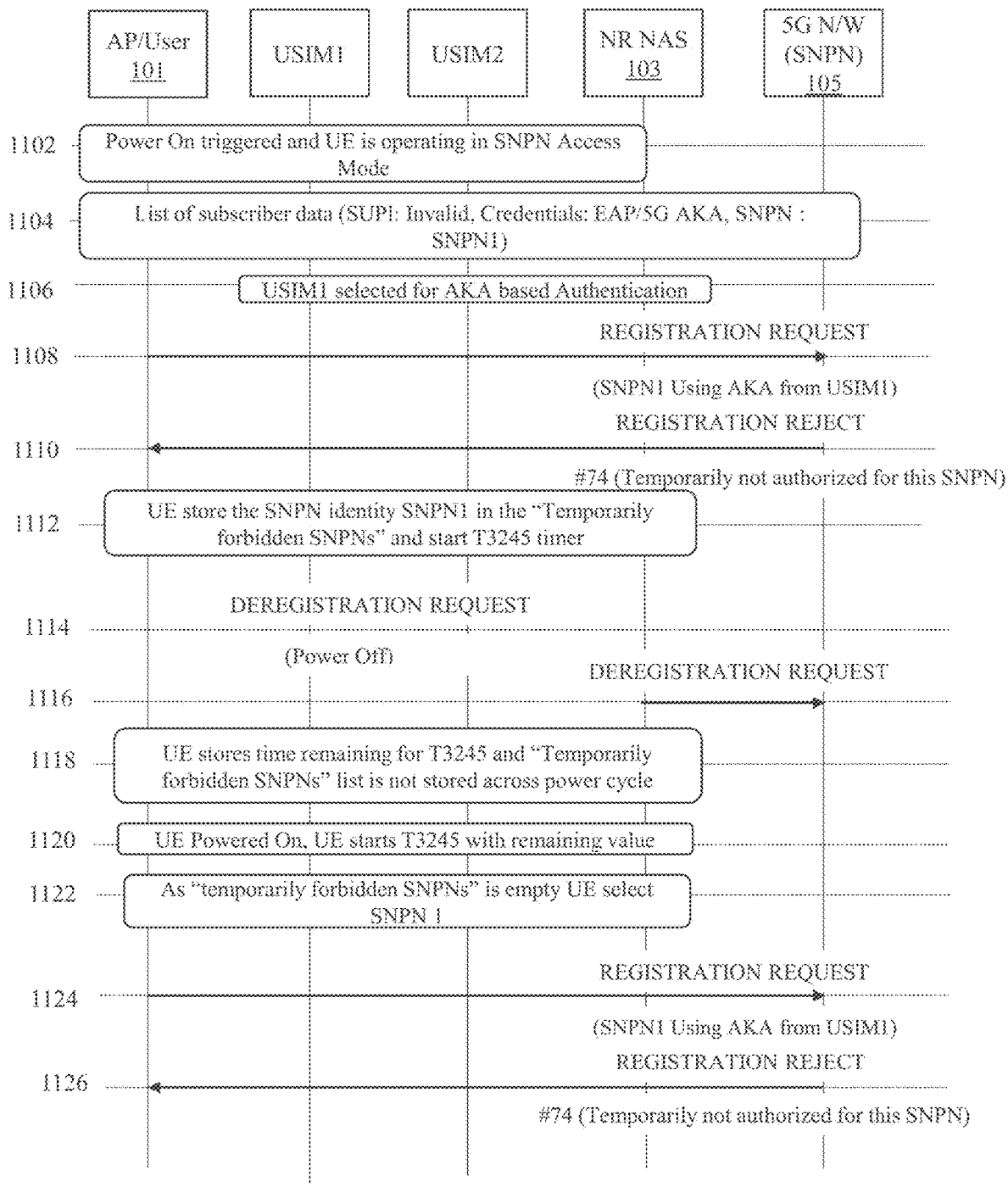
FIG. 11 illustrates a sequence of operations depicting a challenge associated with AKA-based SNPN in a multi-SIM scenario, according to state of the art.

FIG. 11 illustrates a sequence of operations depicting a challenge associated with AKA-based SNPN in a multi-SIM scenario, according to state of art. In this scenario, the sequence of operations corresponds to a communication between the UE 101, the NR NAS 103, and the network 105. The user device 101 may be a MUSIM device. In examples, the UE 101 may be a dual SIM device that includes the USIM1 and the USIM2.

The operations illustrated in FIG. 11 are similar to the operations in FIG. 9, however, the operations in FIG. 11 relate to temporarily forbidden SNPNs. Specifically, at operation 1110, the network 105 may reject the registration request based on the condition that the USIM1 is temporarily not authorized to subscribe to the selected SNPN. However, in the scenario illustrated in FIG. 11, the UE 101 may only store the timer T3245 access to the power cycle and may not store the list of "temporarily forbidden SNPNs", as done for (e.g., similar to the approach for "permanently forbidden SNPNs" discussed above). Thus, the UE 101 may again initiate a registration process with the forbidden SNPNs in the next power cycle, in case the timer T3245 is yet to lapse. This may lead to wastage of time, user from not availing normal services, and resources during the subscription of a USIM with an SNPN.

Figure 12:
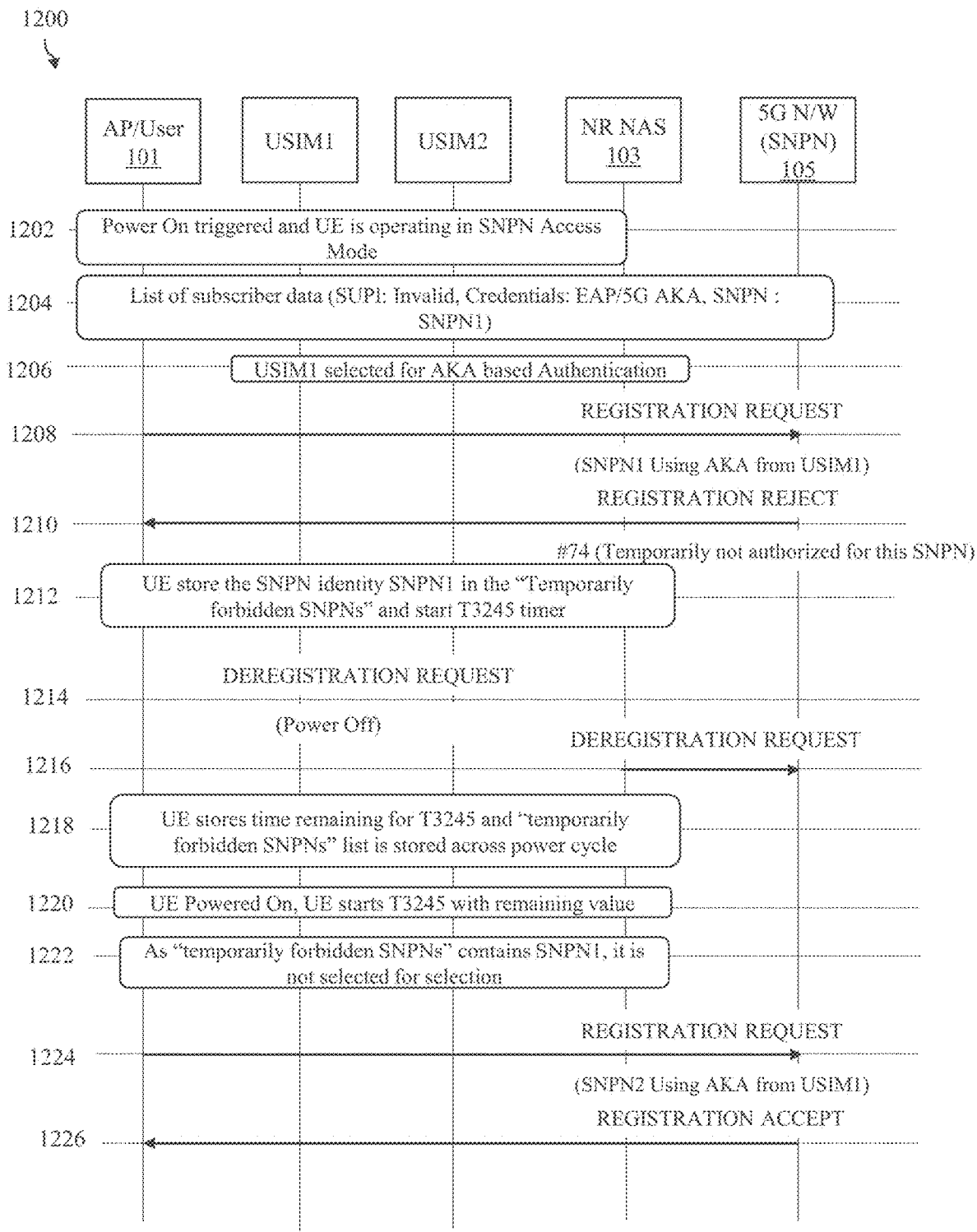
FIG. 12 illustrates a sequence of operations of a method for addressing the challenge illustrated in FIG. 11, according to embodiments of the present disclosure.

FIG. 12 illustrates a sequence of operation of a method 1200 for addressing the challenge illustrated in FIG. 11, according to embodiments of the present disclosure. The operations of the method 1200 may be performed by the UE 101 and the network 105, which may be communicably coupled with each other via the NR NAS 103. Operations 1202-1216 of the method 1200 are similar to the operations 1102-1116 discussed in FIG. 11, therefore only distinct operations have been explained in detail in reference to FIG. 12 for the sake of brevity.

Specifically, at operation 1218, instead of only storing the remaining value of the timer T3245 across power cycles, as previously done at operation 1118, the UE 101 may also store the list of "temporarily forbidden SNPNs" across power cycles. Therefore, at operation 1222, the UE 101 may not select SNPN1 for subscription as SNPN1 may be stored in the list of "temporarily forbidden SNPNs". Accordingly, at operations 1224-1226, the USIM1 may successfully register with SNPN2.

Therefore, the method 1200 may prevent or reduce lack of access to normal services, and the wastage of resources time, while subscribing to an SNPN.

Figure 13:
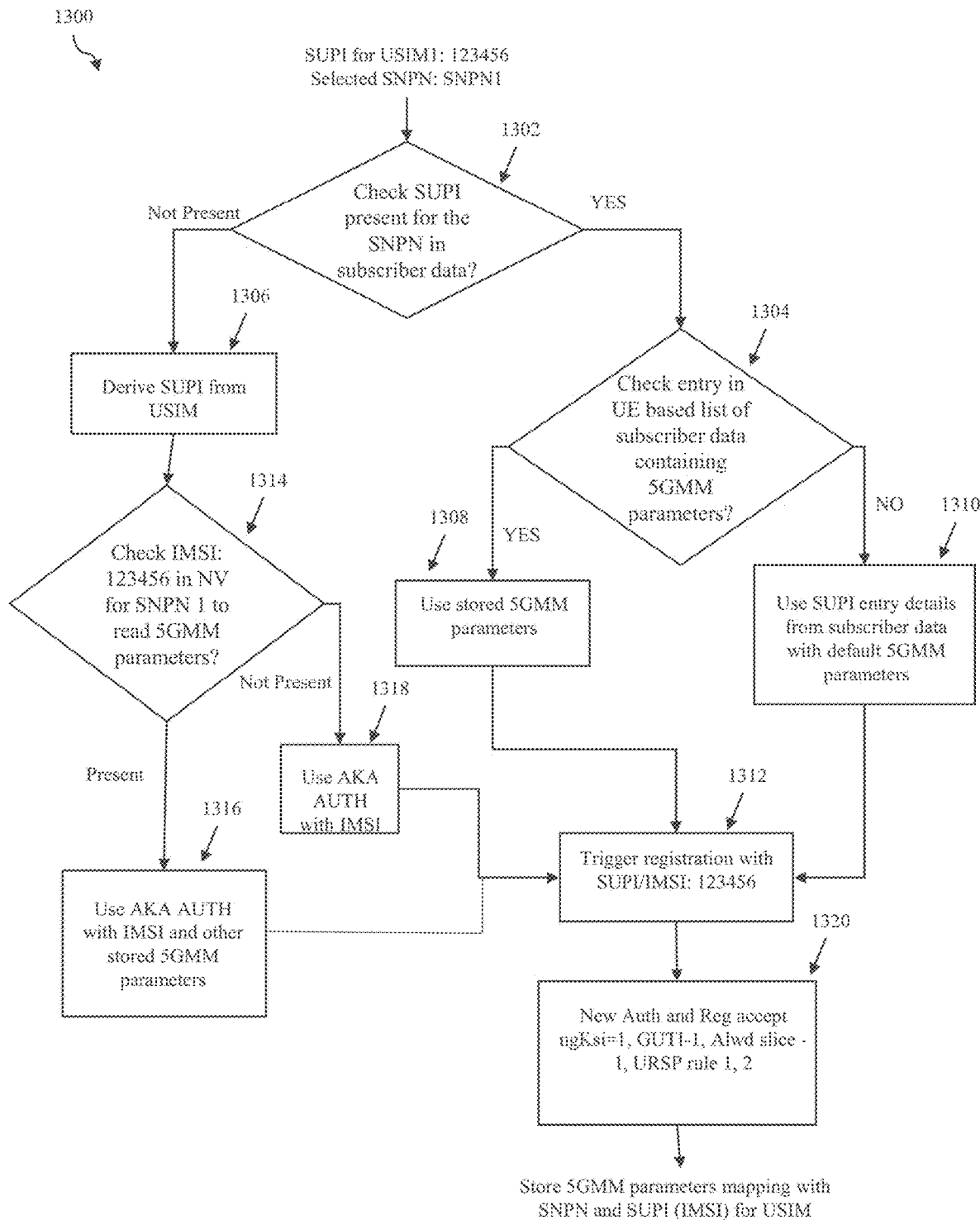
FIG. 13 illustrates an example process flow depicting a method of storing 5GMM parameters of an SNPN at a User Equipment (UE), according to embodiments of the present disclosure.

FIG. 13 illustrates an example process flow of a method 1300 of storing 5GMM parameters of an SNPN at a User Equipment (UE), according to embodiments of the present disclosure.

The method 1300 may be based on assumption that a SUPI value is associated with a USIM (e.g., USIM1) as 123456, and the selected SNPN is SNPN1. At operation 1302, the method 1300 may include checking whether the "list of subscriber data" as defined by the vendor/operator (may also be referred to as "operator-based list of subscriber data") includes a valid SUPI value for the selected SNPN. In case, the operator-based list of subscriber data includes a valid SUPI value corresponding to the selected SNPN (e.g., SNPN1), the method 1300 may perform operation 1304. Specifically, at operation 1304, the method 1300 may determine whether a UE-based list of subscriber data which is stored at the UE 101, includes 5GMM parameters corresponding to selected SNPN and the identified SUPI value. In case, the UE-based list of subscriber data includes 5GMM parameters corresponding to the selected SNPN and the identified SUPI, the UE 101 may use the stored 5GMM parameters to establish the connection of the USIM (e.g., USIM1) and the selected SNPN (e.g., SNPN1), as indicated in operation 1308. However, in case the UE-based list of subscriber data does not include 5GMM parameters corresponding to the selected SNPN and the identified SUPI, the method 1300 may include using SUPI entry details from the operator-based list of subscriber data (e.g., default 5GMM parameters) to establish a connection of the USIM (e.g., USIM1) and the selected SNPN (e.g., SNPN1), as indicated in operation 1310.

Moreover, in case the operator-based list of subscriber data does not include a valid SUPI value, the method 1300 may include deriving a SUPI value from the USIM, as shown in operation 1306. In embodiments, the International Mobile Subscriber Identity (IMSI) value of the USIM may correspond to the SUPI of the USIM. At operation 1314, the method 1300 may include determining whether the memory includes 5GMM parameters corresponding to the IMSI value/SUPI value of USIM and the selected SNPN. In case, the 5GMM parameters corresponding to the IMSI/SUPI value of USIM and the selected SNPN are available, the method 1300 may use AKA-based authentication with IMSI/SUPI value and other 5GMM parameters, as shown in operation 1316. However, in case the 5GMM parameters corresponding to the IMSI/SUPI value of USIM and the selected SNPN are not available, the method 1300 may include using the AKA-based authentication using the IMSI/SUPI value only, as shown in operation 1318.

At operation 1312, the method 1300 may include triggering the registration of the USIM with the selected SNPN. Upon successful registration, the UE 101 may receive 5G-GUTI and 5GMM parameters including information such as, but not limited to, ngKSI value as 1, GUTI-1, allowed slice as 1, UE Route Selection Policy (URSP) rules as 1, 2, and so forth, as shown in operation 1320. Further, the UE 101 may effectively store the received 5G-GUTI and the 5GMM parameters along with the associated SNPN and SUPI/IMSI values of USIM.

According to embodiments, the UE-based list of subscriber data may include information as highlighted in Table 1, below:

TABLE 1

| UE-based list of subscriber data containing 5GMM parameters | | | | | | |
|---|---|---|---|---|---|---|
| SNPN ID | SUPI | 5G-GUTI | Allowed Slice | Auth Keys | Temporary Forbidden SNPN | Permanent Forbidden SNPN |
| Index1 | N/A | N/A | N/A | N/A | N/A | N/A |
| Index2 | N/A | N/A | N/A | N/A | N/A | N/A |

Further, an operator-based list of subscriber data may include information as highlighted in Table 2, below:

TABLE 2

| Operator-based list of subscriber data containing 5GMM parameters | | | |
|---|---|---|---|
| SNPN ID | SUPI | Credentials | Default Subscribed Slice |
| List 1 SNPN1 | N/A | N/A-AKA Based | 1, 2 |
| List 2 SNPN2 | N/A | N/A N/A-AKA Based | 2 |
| List 3 SNPN3 | xyz@abc.com | TLS Certificate | Slice |

However, these are merely embodiments, and Table 1 and Table 2 may include and/or omit any information.

Example of information updated at the UE 101 as a result of the method 1300 is as follows:

| UE-based list of subscriber data containing 5GMM parameters | | | | | | |
|---|---|---|---|---|---|---|
| SNPN ID | SUPI | 5G-GUTI | Allowed Slice | Auth Keys | Temporary Forbidden SNPN | Permanent Forbidden SNPN |
| Index1 | 1 | 123456 | GUTI-1 | 1, 2 | ngKSI = 1 | 0 | 0 |
| Index2 | N/A | N/A | N/A | N/A | N/A | N/A | N/A |

Figure 14:
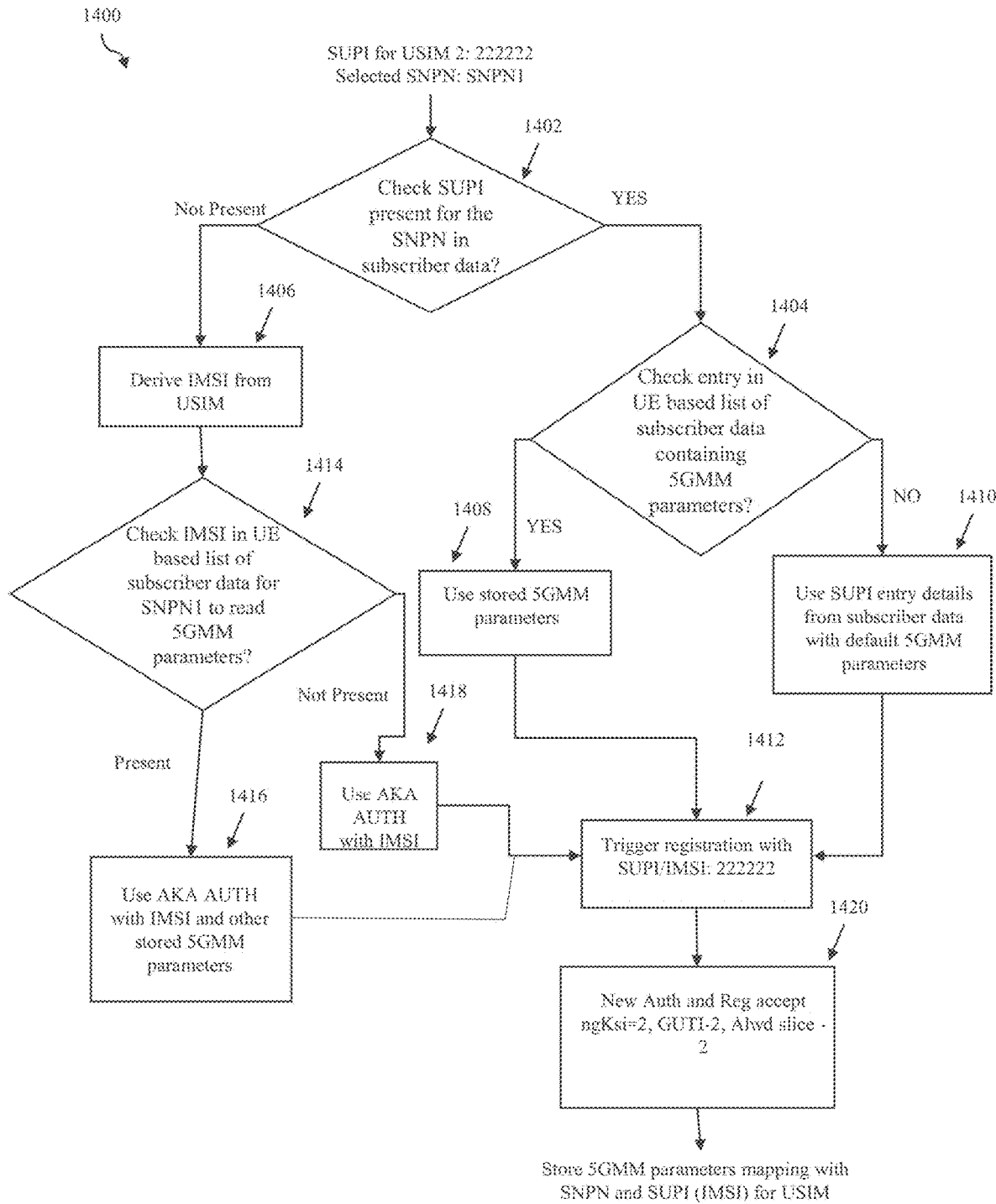
FIG. 14 illustrates an example process flow depicting a method of storing 5GMM parameters of an SNPN at the UE, according to embodiments of the present disclosure.

FIG. 14 illustrates an example process flow of a method 1400 of storing 5GMM parameters of an SNPN at the UE, according to embodiments of the present disclosure. The operations of the method 1400 are similar to operations of the method 1300, therefore similar reference numerals have been provided for corresponding operations and a description of the operations has been omitted for the sake of brevity.

However, the operations of the method 1400 correspond to USIM2 having a SUPI value of 222222. Thus, as a result of the method 1400, the information which may be updated at the UE 101 may be as follow:

| UE-based list of subscriber data containing 5GMM parameters | | | | | | | |
|---|---|---|---|---|---|---|---|
| | SNPN ID | SUPI | 5G-GUTI | Allowed Slice | Auth Keys | Temporary Forbidden SNPN | Permanent Forbidden SNPN |
| Index1 | 1 | 123456 | GUTI-1 | 1, 2 | ngKSI = 1 | 0 | 0 |
| Index2 | 1 | 222222 | GUTI-2 | 1 | ngKSI = 1 | 0 | 0 |

Figure 15:
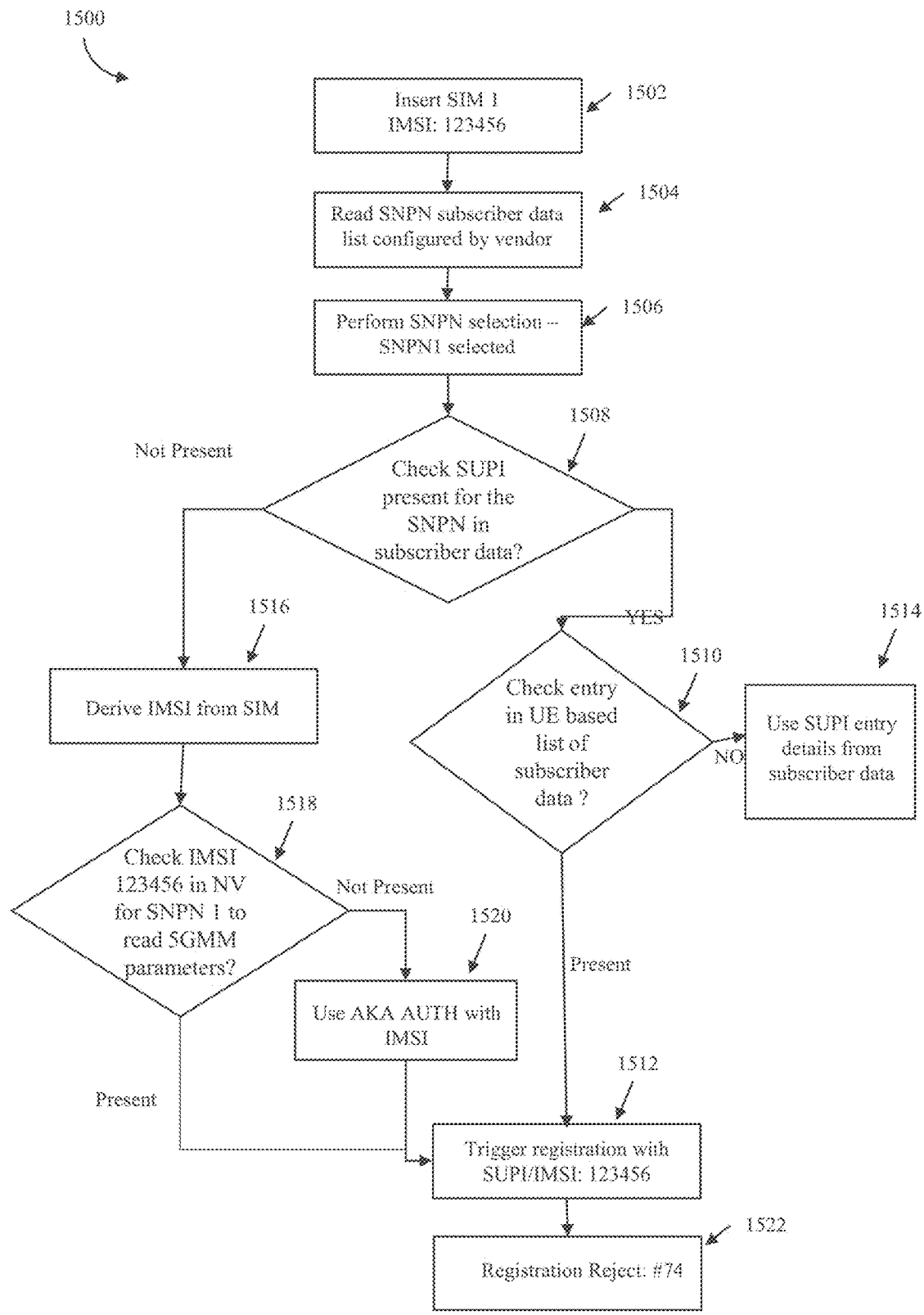
FIG. 15 illustrates an example process flow depicting a method of storing 5GMM parameters of an SNPN at the UE, according to embodiments of the present disclosure.

FIG. 15 illustrates an example process flow depicting a method 1500 of storing 5GMM parameters of an SNPN at the UE 101, according to embodiments of the present disclosure. While most of the operations of the method 1500 are similar to operations discussed in FIGS. 13 and 14, only distinct operations have been explained in view of FIG. 15. Specifically, the operations 1502-1520 have already been discussed at least in FIGS. 13 and 14.

Specifically, FIGS. 13 and 14 relate to scenarios where the registration is completed. However, FIG. 15 corresponds to a scenario where the network 105 may reject the registration reject as shown in operation 1522.

In particular, at operation 1502, a SIM2 with IMSI: 222222 may be inserted at the UE 101. At operation 1504, the UE 101 may read SNPN subscriber data from the operator-based list. At step 1506, the UE may select SNPN1 as the selected SNPN for the connection. Thereafter, the UE 101 may perform operations 1508-1520 which are similar to operations as discussed in FIGS. 13-14. Further, at step 1522, the registration request may be rejected. In such a scenario, the UE-based list may also include two separate columns to store information on forbidden SNPNs, where one column corresponds to temporarily forbidden SNPNs and another column correspond to permanently forbidden SNPNs, as also shown in the table below:

| UE-based list of subscriber data containing 5GMM parameters | | | | | | | |
|---|---|---|---|---|---|---|---|
| | SNPN ID | SUPI | 5G-GUTI | Allowed Slice | Auth Keys | Temporary Forbidden SNPN | Permanent Forbidden SNPN |
| Index1 | 1 | 123456 | 0 | 0 | ngKSI = 7 | SNPN1 | 0 |
| Index2 | N/A | N/A | N/A | N/A | N/A | N/A | N/A |

Figure 16:
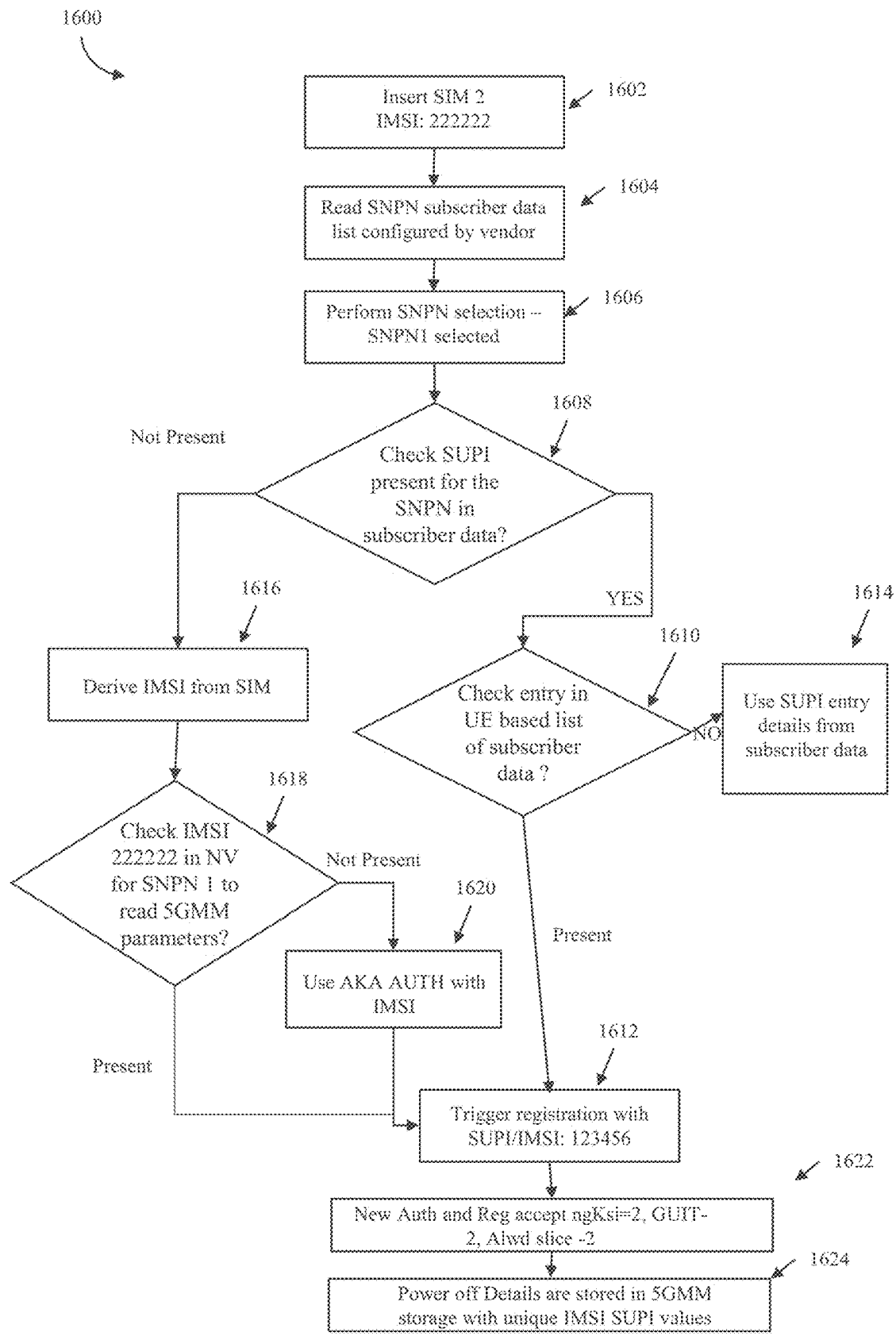
FIG. 16 illustrates an example process flow depicting a method of storing 5GMM parameters of an SNPN at the UE, according to embodiments of the present disclosure.

FIG. 16 illustrates an example process flow depicting a method 1600 of storing 5GMM parameters of an SNPN at the UE, according to embodiments of the present disclosure. While most of the operations of the method 1600 are similar to operations discussed in FIGS. 13-15, only distinct operations have been explained in view of FIG. 16. Specifically, the operations 1602-1620 have already been in discussed at least in FIGS. 13-15. At operation 1622, the method 1600 includes storing 5GMM parameters upon successful registration of USIM with the SNPN. A further operation 1624 may indicate that the method 1600 may also include storing the 5GMM parameters and list of forbidden SNPNs across different power cycles. For example, even for the registration of USIM2 with the SNPN1, the UE 101 may include information stored for USIM1 and SNPN1, as shown below:

| UE-based list of subscriber data containing 5GMM parameters | | | | | | | |
|---|---|---|---|---|---|---|---|
| | SNPN ID | SUPI | 5G-GUTI | Allowed Slice | Auth Keys | Temporary Forbidden SNPN | Permanent Forbidden SNPN |
| Index1 | 1 | 123456 | 0 | 0 | ngKSI = 7 | SNPN1 | 0 |
| Index2 | 1 | 222222 | GUTI-2 | 1 | ngKSI = 1 | 0 | 0 |

Thus, according to the present disclosure, the UE 101 may maintain the list of forbidden SNPNs along with other 5GMM parameters across different power cycles.

Figure 17:
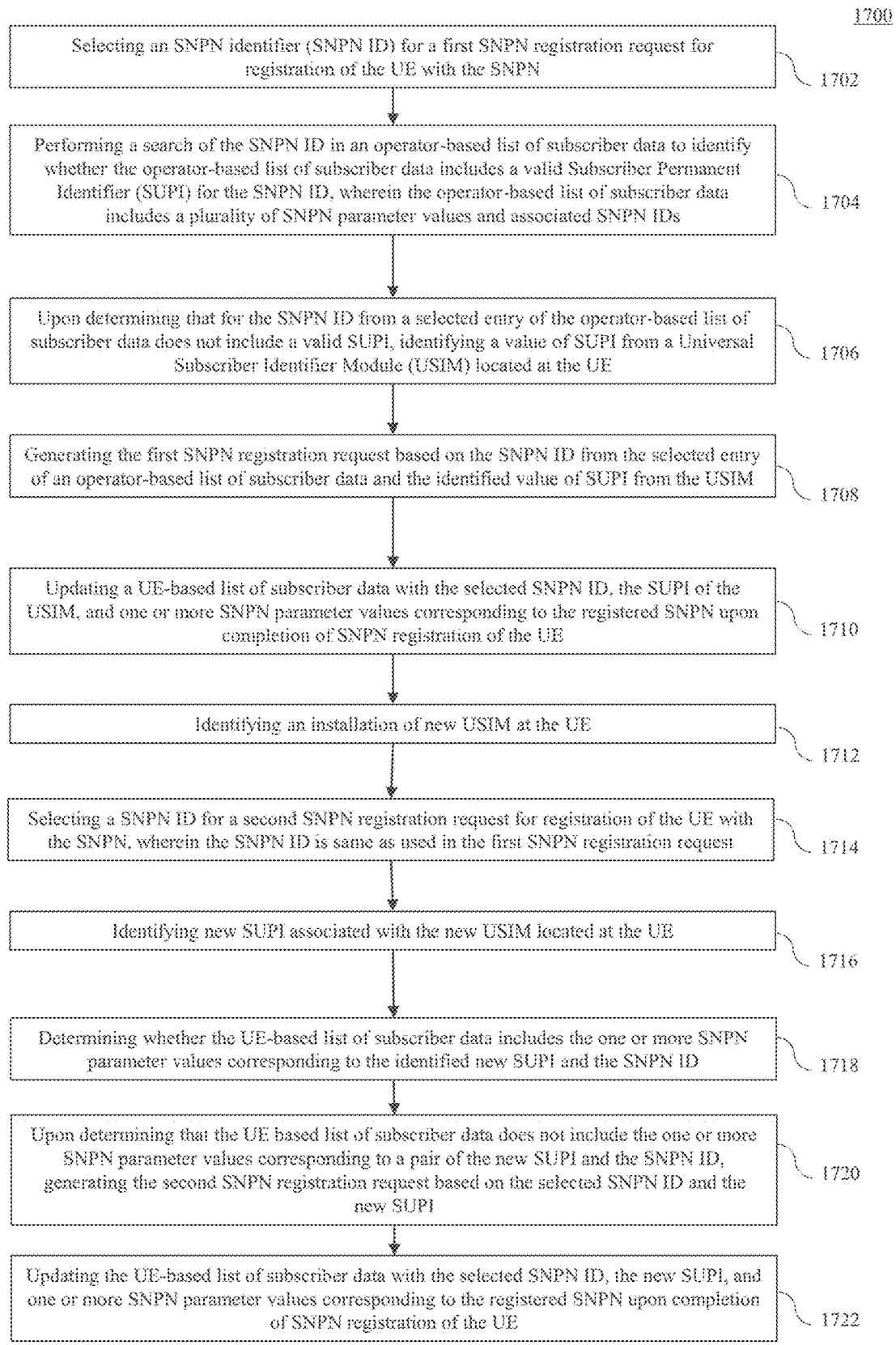
FIG. 17 illustrates a process flow depicting a method for managing 5GMM parameters of an SNPN at the UE, according to embodiments of the present disclosure.

FIG. 17 illustrates a process flow depicting a method 1700 for managing 5GMM parameters of an SNPN at the UE 101, in accordance with embodiments of the present disclosure. The method 1700 may be performed by the UE 101 and/or the network 105. The UE 101 and its associated functions along with architecture are explained in conjunction with FIG. 21. The UE 101 may include, but not limited to, a mobile phone, a smartwatch, a tablet, and any other electronic device which is capable of connecting to a 4G and/or 5G network. Further, the network 105 may represent any suitable network device and/or system configured to establish connection with the UE 101. The UE 101 may be in communication with the network 105 via NR NAS 103. In embodiments, the network 105 may correspond to a 5G network.

At operation 1702, an SNPN identifier (SNPN ID) for a first SNPN registration request may be selected for registration of the UE with the SNPN. According to embodiments, the SNPN ID may be selected from among a plurality of SNPN IDs provided as entries in an operator-based list of subscriber data (also referred to herein as a "first list"). In an embodiment, the SNPN ID may be selected based on input(s) provided by the user. For instance, the user may manually select an SNPN entry with the SNPN ID from the list of subscriber data including all available SNPN IDs. Further, manual selection of the SNPN may correspond to Spec—3GPP TS 23.122-section 4.9.3.1.2. In another embodiment, the UE may select the SNPN ID based on a predefined criteria and/or a predefined selection procedure. In a non-limiting example, the predefined criteria may correspond to a scenario wherein during a power ON state or recovery from loss of coverage state, the UE may select an entry corresponding to an SNPN which may be stored as registered SNPN prior to the power ON state or the loss of coverage state. Further, in a non-limiting example, the predefined selection procedure may correspond to sequentially selecting an SNPN from the list of subscriber data. In some embodiments, the selection of SNPN may be based on Spec—3GPP TS 23.122- Section 4.9.3.1.1.

At operation 1704, search of the SNPN ID in the operator-based list of subscriber data may be performed. The search of the SNPN ID may be performed to identify (e.g., determine) whether the operator-based list of subscriber data includes a valid Subscriber Permanent Identifier (SUPI) for the SNPN ID. The operator-based list of subscriber data may include a plurality of predefined or alternatively, given SNPN parameter values and associated SNPN IDs (e.g., respective SNPN parameter values associated with each of the SNPN IDs, or respective SNPN parameter values associated with a subset of the SNPN IDs). In embodiments, the operator-based list of subscriber data may be prestored (or stored) in the UE 101 prior to installation of the USIM.

At operation 1706, the value of SUPI from a Universal Subscriber Identifier Module (USIM) located at the UE may be identified upon determining that for the SNPN ID from a selected entry of the operator-based list of subscriber data does not include a valid subscriber identifier for the SNPN ID and the UE 101 has a valid USIM. Further, the UE 101 may fetch 5GMM parameters associated with the SUPI and the SNPN ID from the second list if the SUPI matches the subscriber identifier stored in the second list.

At operation 1708, the first SNPN registration request may be generated based on the SNPN ID from the selected entry of an operator-based list of subscriber data and the identified value of SUPI from the USIM. In an embodiment, the first SNPN registration request may be generated based on the SNPN ID and the 5GMM parameters associated with the SUPI.

At operation 1710, a UE-based list of subscriber data (also referred to herein as the "second list") may be updated with the selected SNPN ID, the SUPI of the USIM, and one or more SNPN parameter values corresponding to the registered SNPN upon completion of SNPN registration of the UE. According to embodiments, the one or more SNPN parameter values may be received from the SNPN during, or upon successful completion of, registration with the UE. According to embodiments, the UE may generate a communication signal, and transmit the communication signal via the SNPN using the USIM and the one or more SNPN parameter values after the UE-based list is updated in operation 1710. According to embodiments, the UE may receive communication signal via the SNPN using the USIM and the one or more SNPN parameter values after the UE-based list is updated in operation 1710. In embodiments, the method 1700 may further comprise operations 1712-1722 post the operation 1710. At operation 1712, installation of a new USIM at the UE may be identified. At operation 1714, a SNPN ID for a second SNPN registration request may be selected for registration of the UE with the SNPN. In embodiments, the SNPN ID may be same as, or similar to, that used in the first SNPN registration request.

At operation 1716, a new SUPI may be identified, the new SUPI being associated with the new USIM located at the UE. At operation 1718, a determination is made as to whether the UE-based list of subscriber data includes the one or more SNPN parameter values corresponding to the identified new SUPI and the SNPN ID.

At operation 1720, the second SNPN registration request based on the selected SNPN ID and the new SUPI may be generated upon determining that the UE based list of subscriber data does not include the one or more SNPN parameter values corresponding to a pair of the new SUPI and the SNPN ID. At operation 1722, the UE-based list of subscriber data may be updated with the selected SNPN ID, the new SUPI, and one or more SNPN parameter values corresponding to the registered SNPN upon completion of SNPN registration of the UE. In embodiments, the one or more SNPN parameter values of the registered SNPN correspond to 5G Mobility Management (5GMM) parameters.

Figure 18:
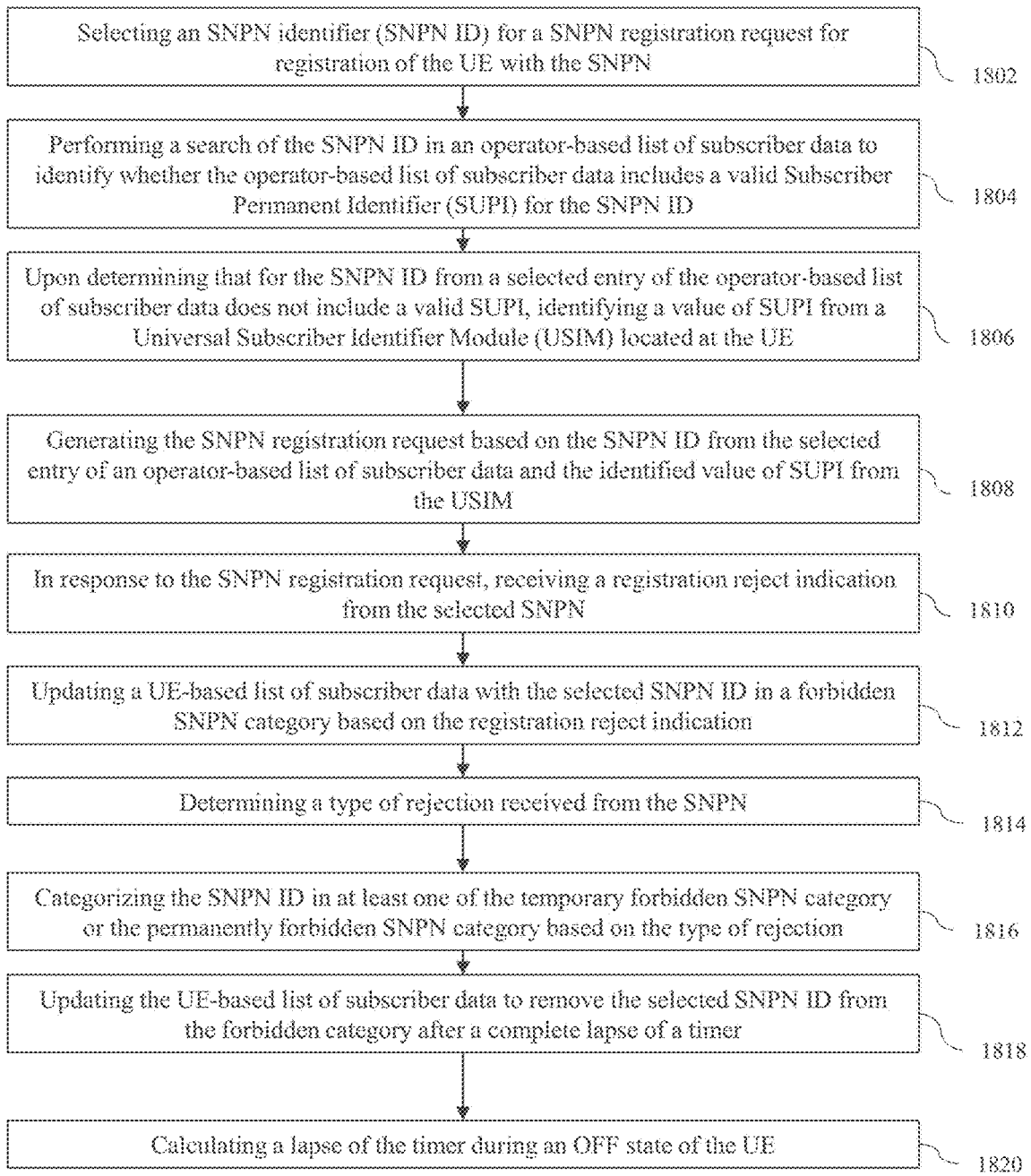
FIG. 18 illustrates a process flow depicting a method for managing 5GMM parameters of an SNPN at the UE, according to embodiments of the present disclosure.

FIG. 18 illustrates a process flow depicting a method 1800 for managing 5GMM parameters of an SNPN at the UE 101, in accordance with embodiments of the present disclosure. The method 1800 may be performed by the UE 101 and the network 105. The UE 101 and its associated functions along with architecture is explained in conjunction with at least FIG. 21. The UE 101 may include, but is not limited to, a mobile phone, a smart watch, a tablet, and any other electronic device which is capable of connecting to a 4G and/or 5G network. Further, the network 105 may represent any suitable network device and/or system configured to establish connection with the UE 101. The UE 101 may be in communication with the network 105 via NR NAS 103. In embodiments, the network 105 may correspond to a 5G network. At operation 1802, an SNPN identifier (SNPN ID) for a SNPN registration request may be selected for registration of the UE with the SNPN. According to embodiments, the SNPN ID may be selected from among a plurality of SNPN IDs provided as entries in an operator-based list of subscriber data (also referred to herein as a "first list").

At operation 1804, a search for the SNPN ID in the operator-based list of subscriber data may be performed. The search of the SNPN ID may be performed to identify whether the operator-based list of subscriber data includes a valid Subscriber Permanent Identifier (SUPI) for the SNPN ID. The operator-based list of subscriber data may include a plurality of predefined or alternatively, given SNPN parameter values and associated SNPN IDs (e.g., respective SNPN parameter values associated with each of the SNPN IDs, or respective SNPN parameter values associated with a subset of the SNPN IDs).

At operation 1806, a value of a SUPI from a Universal Subscriber Identifier Module (USIM) located at the UE may be identified upon determining that for the SNPN ID from a selected entry of the operator-based list of subscriber data does not include a valid SUPI. In an embodiment, the UE 101 may determine that the selected entry of the operator-based list of subscriber data does not include a valid SUPI, upon identifying that a value of SUPI corresponds to one of "0", "0XF", or "invalid". Further, an entry including an invalid SUPI may also include a status field indicating the validity of SUPI, which may be used by the UE 101 to determine whether the selected entry includes a valid SUPI or not. In another embodiment, the entry having the invalid SUPI may also correspond to a value of credentials as invalid or empty, which may also be used by the UE 101 to determine whether the selected entry includes a valid SUPI. Embodiments are exemplary in nature and the present disclosure either covers or intend to cover any suitable technique for determining an invalid SUPI for the selected entry from the operator-based list.

At operation 1808, the SNPN registration request may be generated based on the SNPN ID from the selected entry of an operator-based list of subscriber data and the identified value of SUPI from the USIM. At operation 1810, a registration reject indication from the selected SNPN may be received in response to the SNPN registration request.

At operation 1812, a UE-based list of subscriber data (also referred to herein as the "second list") may be updated with the selected SNPN ID in a forbidden SNPN category based on the registration reject indication. In embodiments, the forbidden SNPN category may be classified as a temporary forbidden SNPN category or a permanent forbidden SNPN category. The temporary forbidden SNPN category may include SNPNs that the UE 101 may be able to access after a lapse of predefined or alternatively, given timer or the SNPNs which are temporarily unavailable for the selected USIM. In an embodiment, the temporary forbidden SNPN may correspond to SNPN IDs which may not be globally unique and rejected by the network with 5GMM cause #74. In some embodiments, the determination whether the SNPN ID is globally unique or not is made in reference to 3GPP T 23.003 section 12.7.1. Further, the UE 101 may use said information corresponding to SNPN ID and rejection cause to determine whether the rejection corresponds to the temporary forbidden SNPN category. The permanent forbidden SNPN category may include SNPNs for which the selected USIM is unauthorized to access for predefined or alternatively, given timer. In an embodiment, the permanent forbidden SNPN may correspond to SNPN IDs which may be globally unique and rejected by the network with 5GMM cause #75. Further, the UE 101 may use said information corresponding to SNPN ID and rejection cause to determine whether the rejection corresponds to the permanent forbidden SNPN category. According to embodiments, an attempt by the UE to register with the SNPN associated with SNPN ID in the forbidden SNPN category before expiry of the predefined or alternatively, given timer may be blocked (e.g., skipped, avoided, etc.). According to embodiments, the UE may register with the SNPN associated with SNPN ID in the forbidden SNPN category after expiry of the predefined or alternatively, given timer, obtain one or more SNPN parameter values from the SNPN during, or upon successful completion of, registration with the UE, and update the UE-based list (e.g., according to operations similar to those discussed above in connection with FIG. 17). According to embodiments, the UE may generate a communication signal, and transmit the communication signal via the SNPN using the obtained one or more SNPN parameter values after the UE-based list is updated. According to embodiments, the UE may receive communication signal via the SNPN using the obtained one or more SNPN parameter values after the UE-based list is updated.

In embodiments, the method 1800 may further comprise operations 1814-1820 post the operation 1812. At operation 1814, a type of rejection received from the SNPN may be determined. Further, at operation 1816, the SNPN ID may be categorized in at least one of the temporary forbidden SNPN category or the permanently forbidden SNPN category based on the type of rejection.

Moreover, at operation 1818, in case the SNPN belongs the temporary or permanent forbidden SNPN category, the UE-based list of subscriber data may be updated to remove the selected SNPN ID from the forbidden category after a complete lapse of a predefined or alternatively, given timer. Also, at operation 1820, a lapse of (e.g., a time duration elapsed by) the predefined or alternatively, given timer may be calculated during an OFF state of the UE 101. Thus, the UE 101 may be able to effectively access the temporary or permanent forbidden SNPNs after a restricted time period.

For example, the UE 101 may initially camp on the SNPN1 which is globally unique and may attempt registration. Further, the network may reject the registration with 5GMM cause #75. Accordingly, the SNPN1 may be added to the permanent forbidden SNPN list. For Example, the UE 101 may configure a timer T3245 timer with a duration of 12 hours. After a lapse of 5 hours, the UE 101 is powered off. In such a scenario, the UE 101 may save a value of time lapsed for the timer T3245 and a power off time. Thereafter, when the UE 101 is powered ON after a lapse of 1 hour, the UE 101 may determine the remaining time of the timer T3245 using the previously saved power off time, and stored value of time lapsed for the timer T3245 and the current time during the power off condition.

Further, in embodiments, the UE-based list of subscriber data is stored in a non-volatile memory of UE 101, and the UE-based list includes a list of SNPN IDs in the forbidden category (e.g., the UE-based list may include a plurality of SNPN IDs and those SNPN IDs in the forbidden category may be associated with a corresponding indication reflecting this fact).

Figure 19:
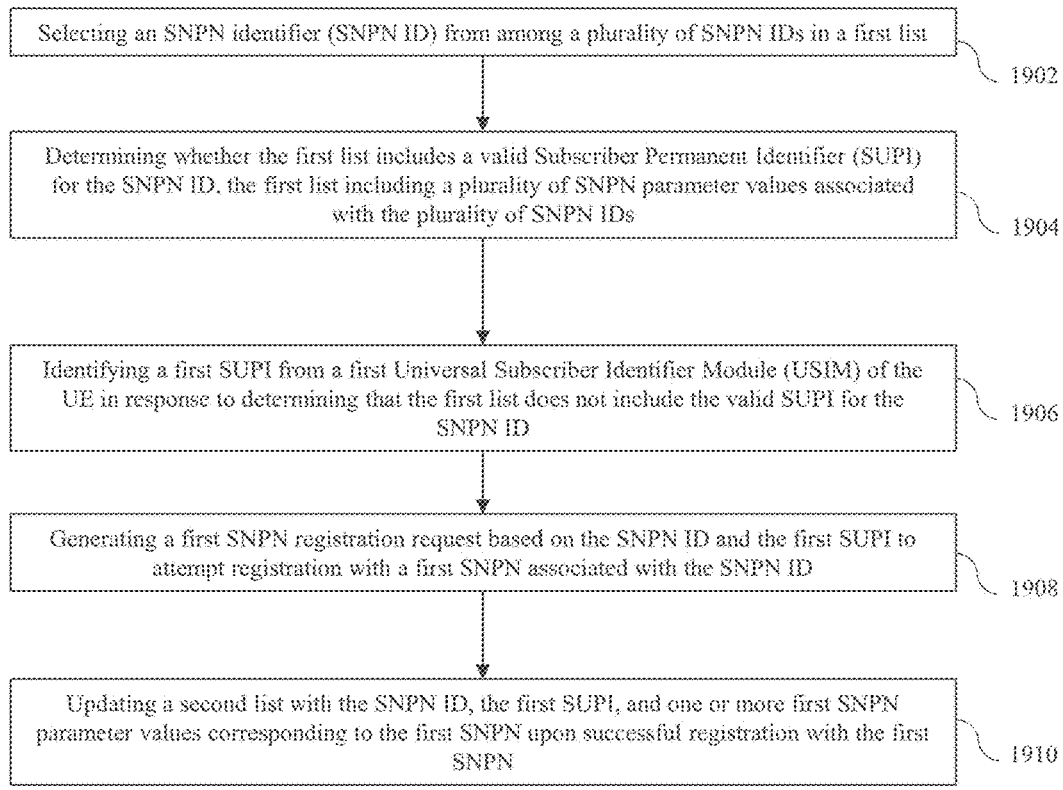
FIG. 19 illustrates a process flow depicting a method for managing 5GMM parameters of an SNPN at the UE, in accordance with embodiments of the present disclosure.

FIG. 19 illustrates a process flow depicting a method 1900 for managing 5GMM parameters of an SNPN at the UE 101, in accordance with embodiments of the present disclosure. At operation 1902, the method 1900 may comprise selecting an SNPN identifier (SNPN ID) from among a plurality of SNPN IDs in a first list. At operation 1904, the method 1900 may comprise determining whether the first list includes a valid Subscriber Permanent Identifier (SUPI) for the SNPN ID, the first list including a plurality of SNPN parameter values associated with the plurality of SNPN IDs.

Further, at operation 1906, the method 1900 may comprise identifying a first SUPI from a first Universal Subscriber Identifier Module (USIM) of the UE in response to determining that the first list does not include the valid SUPI for the SNPN ID. Moreover, at operation 1908, the method 1900 may comprise generating a first SNPN registration request based on the SNPN ID and the first SUPI to attempt registration with a first SNPN associated with the SNPN ID. Thereafter, at operation 1910, the method 1900 may comprise updating a second list with the SNPN ID, the first SUPI, and one or more first SNPN parameter values corresponding to the first SNPN upon successful registration with the first SNPN.

Figure 20:
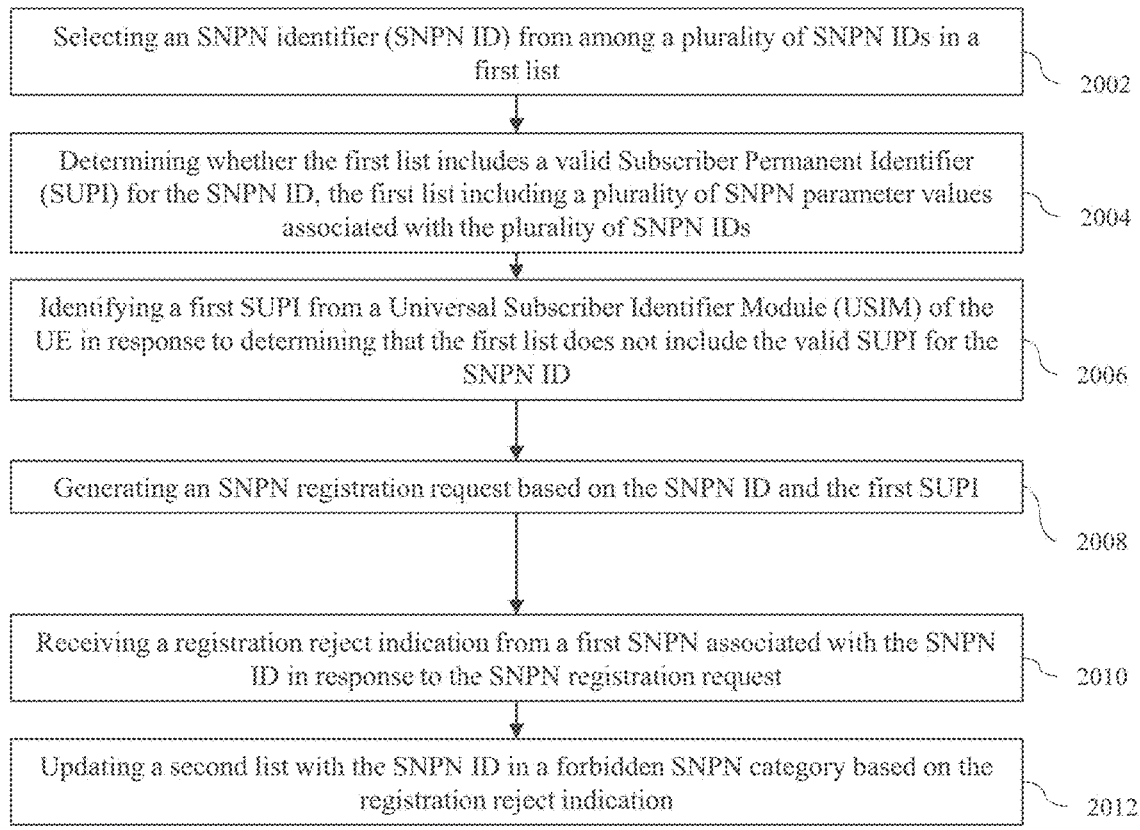
FIG. 20 illustrates a process flow depicting a method for managing 5GMM parameters of an SNPN at the UE, in accordance with embodiments of the present disclosure.

FIG. 20 illustrates a process flow depicting a method 2000 for managing 5GMM parameters of an SNPN at the UE 101, in accordance with embodiments of the present disclosure. At operation 2002, the method 2000 may comprise selecting an SNPN identifier (SNPN ID) from among a plurality of SNPN IDs in a first list. At operation 2004, the method 2000 may comprise determining whether the first list includes a valid Subscriber Permanent Identifier (SUPI) for the SNPN ID, the first list including a plurality of SNPN parameter values associated with the plurality of SNPN IDs.

Further, at operation 2006, the method 2000 may comprise identifying a first SUPI from a Universal Subscriber Identifier Module (USIM) of the UE in response to determining that the first list does not include the valid SUPI for the SNPN ID. Moreover, at operation 2008, the method 2000 may comprise generating an SNPN registration request based on the SNPN ID and the first SUPI. Thereafter, at operation 2010, the method 2000 may comprise receiving a registration reject indication from a first SNPN associated with the SNPN ID in response to the SNPN registration request. At operation 2012, the method 200 may comprise updating a second list with the SNPN ID in a forbidden SNPN category based on the registration reject indication.

Conventional devices and methods for managing 5GMM parameters of an SNPN at a UE result in excessive failures in registering with the SNPN. For example, the conventional devices and methods map the SNPN with a SUPI from a list of subscriber data regardless of whether the SUPI from the list is valid. Also, the conventional devices and methods attempt to connect with an SNPN via a first USIM using parameters (e.g., SNPN parameters and/or 5GMM parameters) associated with a second (e.g., different) USIM. These approaches by the conventional devices and methods result in attempts to connect with SNPNs using invalid SUPIs and/or invalid parameters, causing an excessive amount of connection failures. Additionally, the conventional devices and methods do not track failed registration attempt responses, indicating that registration to a corresponding SNPN is forbidden, through a power cycle. Accordingly, the conventional devices and methods attempt re-registration to SNPNs for which registration is forbidden, resulting an excessive amount of registration failures. The excessive connection and registration failures of the conventional devices and methods, and corresponding re-attempts, result in excessive resource consumption (e.g., power, processor, memory, bandwidth, delay, etc.).

However, according to embodiments, improved devices and methods are provided for managing 5GMM parameters of an SNPN at a UE. For example, the improved devices and methods may determine whether the list of subscriber data includes a valid SUPI for an SNPN and, if not, use a SUPI from a USIM of the UE. Also, the improved devices and methods may manage a list of SNPN IDs in association with respective SUPIs of USIMs and corresponding SNPN parameters (e.g., 5GMM parameters), enabling use of SNPN parameters and/or SUPIs associated with the proper USIM and/or SNPN. Additionally, the managed list may also include an indication of a forbidden SNPN in instances in which failed registration attempt responses are received indicating that registration to the SNPN is forbidden, thereby enabling tracking of this forbidden state through power cycles, as well as avoidance or reduction in re-registration attempts to the forbidden SNPN while the forbidden status remains (e.g., until expiry of a corresponding timer). Accordingly, the improved devices and methods overcome the deficiencies of the conventional devices and methods to at least reduce connection and registration failures, and thus, reduce resource consumption (e.g., power, processor, memory, bandwidth, delay, etc.).

Figure 21:
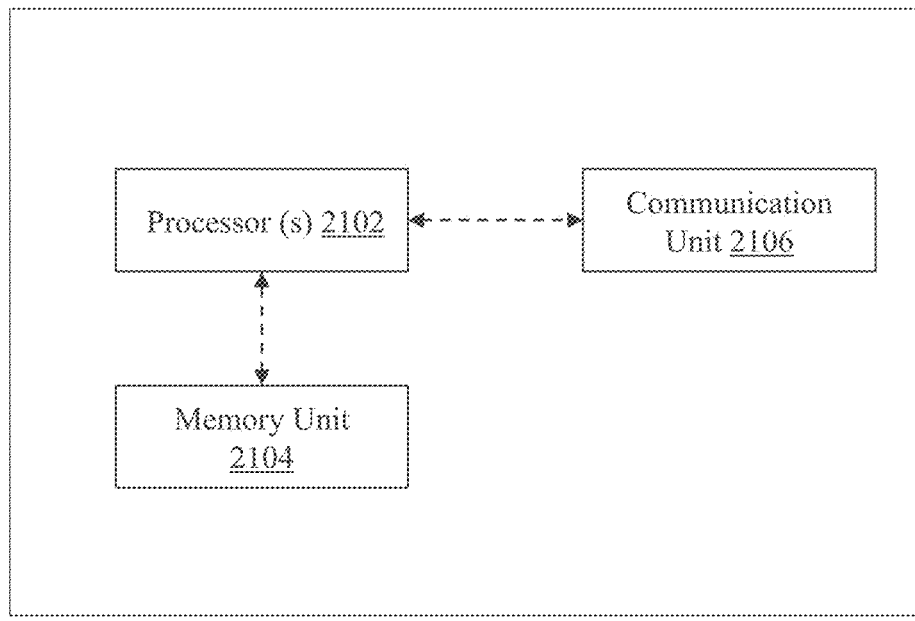
FIG. 21 is a diagram illustrating the configuration of the UE in a wireless communication system, according to embodiments of the present disclosure.

FIG. 21 is a diagram illustrating the configuration of a user equipment (UE) 2100 in a wireless communication system, according to embodiments of the present disclosure. The configuration of FIG. 21 may be understood as a part of the configuration of the UE 2100. Further, the methods disclosed above may be implemented by the UE 2100 according to a embodiments. In embodiments, the UE 2100 corresponds to the UE 101. Hereinafter, it is understood that terms including "unit" or "module" at the end may refer to the unit for processing at least one function or operation and may be implemented in hardware, software, or a combination of hardware and software.

Referring to FIG. 21, the UE 2100 may include at least one processor 2102 (may also be referred to herein in the singular "the processor 2102"), a communication unit 2106 (e.g., communicator or communication interface), and/or a memory unit 2104 (e.g., storage). By way of example, the UE 2100 may be a User Equipment, such as a cellular phone or other devices that communicate over a plurality of cellular networks (such as a 3G, 4G, a 5G or pre-5G, 6G network or any future wireless communication network). The communication unit 2104 may perform functions for transmitting and/or receiving signals via a wireless channel.

As an example, the processor 2102 may be a single processing unit or a number of units, all of which could include multiple computing units. The processor 2102 may be implemented as one or more microprocessors, microcomputers, microcontrollers, digital signal processors, central processing units, state machines, logic circuitries, and/or any devices that manipulate signals based on operational instructions. Among other capabilities, the processor 2102 is configured to fetch and execute computer-readable instructions and data stored in the memory. The processor 2102 may include one or a plurality of processors. At this time, one or a plurality of processors 2102 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 2102 may control the processing of the input data in accordance with a predefined or alternatively, given operating rule or artificial intelligence (AI) model stored in the non-volatile memory and the volatile memory, e.g., the memory unit 2104. The predefined or alternatively, given operating rule or artificial intelligence model is provided through training or learning.

The memory unit 2104 may include any non-transitory computer-readable medium known in the art including, for example, volatile memory, such as Static Random Access Memory (SRAM) and Dynamic Random Access Memory (DRAM), and/or non-volatile memory, such as Read-Only Memory (ROM), erasable programmable ROM, flash memories, hard disks, optical disks, and magnetic tapes. According to embodiments, the memory unit 2104 may store the first list and the second list.

Embodiments disclosed herein may be implemented using processing circuitry. For example, according to embodiments, operations described herein as being performed by the UE 101, the NR NAS 103, the network 105, the UE 2100, the at least one processor 2102 and/or the communication unit 2106 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For instance, embodiments disclosed herein may be implemented using at least one software program running on at least one hardware device and performing network management functions to control the elements.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

In embodiments, the configuration illustrated in FIG. 21 and discussed above may also correspond to a configuration of one or more network devices of the network 105, which may be used to implement the present disclosure.

While specific language has been used to describe the disclosure, any limitations arising on account of the same are not intended. As would be apparent to a person in the art, various working modifications may be made to the method in order to implement the inventive concepts as taught herein.

The drawings and the forgoing description give examples of embodiments. Those skilled in the art will appreciate that one or more of the described elements may well be combined into a single functional element. Alternatively, certain elements may be split into multiple functional elements. Elements from one example may be added to another example. For example, orders of processes described herein may be changed and are not limited to the manner described herein.

Moreover, the actions (e.g., operations) of any flow diagram need not be implemented in the order shown; nor do all of the acts necessarily need to be performed. For example, actions or operations illustrated as being performed serially in two consecutive blocks may actually be performed concurrently, simultaneously, contemporaneously, or in some cases be performed in reverse order. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to challenges have been described above with regard to specific examples. However, the benefits, advantages, solutions to challenges, and any component(s) that may cause any benefit, advantage, or solution to occur or become more pronounced are not to be construed as a critical, required, or essential feature or component of any or all the claims.

We claim:

1. A method for managing 5G Mobility Management (5GMM) parameters of a Standalone Non Public Network (SNPN) at a User Equipment (UE), the method comprising:
   selecting an SNPN identifier (SNPN ID) from among a plurality of SNPN IDs in a first list;
   determining whether the first list includes a valid Subscriber Permanent Identifier (SUPI) for the SNPN ID, the first list including a plurality of SNPN parameter values associated with the plurality of SNPN IDs;
   identifying a first SUPI from a first Universal Subscriber Identifier Module (USIM) of the UE in response to determining that the first list does not include the valid SUPI for the SNPN ID;
   generating a first SNPN registration request based on the SNPN ID and the first SUPI to attempt registration with a first SNPN associated with the SNPN ID; and
   updating a second list with the SNPN ID, the first SUPI, and one or more first SNPN parameter values corresponding to the first SNPN upon successful registration with the first SNPN.

2. The method as claimed in claim 1, wherein the first list is stored on the UE prior to installation of the first USIM at the UE.

3. The method as claimed in claim 1, wherein the one or more first SNPN parameter values of the first SNPN correspond to 5G Mobility Management (5GMM) parameters.

4. The method as claimed in claim 1, comprising:
   identifying a new installation of a second USIM at the UE;
   identifying a second SUPI associated with the second USIM;
   determining whether the second list includes one or more second SNPN parameter values corresponding to the second SUPI and the SNPN ID;
   generating a second SNPN registration request based on the SNPN ID and the second SUPI to attempt registration with the first SNPN in response to determining that the second list does not include the one or more second SNPN parameter values; and
   updating the second list with the SNPN ID, the second SUPI, and the one or more second SNPN parameter values corresponding to the first SNPN upon successful registration with the first SNPN.

5. A device for managing 5GMM parameters of an SNPN at a User Equipment (UE), the device comprising:

processing circuitry configured to:

select an SNPN identifier (SNPN ID) from among a plurality of SNPN IDs in a first list, determine whether the first list includes a valid Subscriber Permanent Identifier (SUPI) for the SNPN ID, the first list including a plurality of SNPN parameter values associated with the plurality of SNPN IDs, identify a first SUPI from a first Universal Subscriber Identifier Module (USIM) of the UE in response to determining that the first list does not include the valid SUPI for the SNPN ID, generate a first SNPN registration request based on the SNPN ID and the first SUPI to attempt registration with a first SNPN associated with the SNPN ID, and update a second list with the SNPN ID, the first SUPI, and one or more first SNPN parameter values corresponding to the first SNPN upon successful registration with the first SNPN.

6. The device as claimed in claim 5, wherein the first list is stored on the UE prior to installation of the first USIM at the UE.

7. The device as claimed in claim 5, wherein the one or more first SNPN parameter values of the first SNPN correspond to 5G Mobility Management (5GMM) parameters.

8. The device as claimed in claim 5, wherein the processing circuitry is configured to:

identify a new installation of a second USIM at the UE;

identify a second SUPI associated with the second USIM;

determine whether the second list includes one or more second SNPN parameter values corresponding to the second SUPI and the SNPN ID;

generate a second SNPN registration request based on the SNPN ID and the second SUPI to attempt registration with the first SNPN in response to determining that the second list does not include the one or more second SNPN parameter values; and update the second list with the SNPN ID, the second SUPI, and the one or more second SNPN parameter values corresponding to the first SNPN upon successful registration with the first SNPN.

* * * * *